United States Patent
McCormick et al.

(10) Patent No.: US 6,390,418 B1
(45) Date of Patent: May 21, 2002

(54) TANGENTIALLY DIRECTED ACOUSTIC JET CONTROLLING BOUNDARY LAYER

(75) Inventors: Duane C. McCormick, Colchester; Daniel L. Gysling, Glastonbury, both of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/257,565

(22) Filed: Feb. 25, 1999

(51) Int. Cl.$^7$ .............................................. B64C 23/00
(52) U.S. Cl. ...................... 244/204; 244/130; 244/207; 244/208; 244/1 N
(58) Field of Search .................. 239/4; 244/1 N, 244/130, 204, 207, 208, 209

(56) References Cited

U.S. PATENT DOCUMENTS

| | | | | |
|---|---|---|---|---|
| 3,467,043 A | * | 9/1969 | Bowles | 244/204 |
| 3,774,867 A | * | 11/1973 | Quinn | 244/130 |
| 3,974,986 A | * | 8/1976 | Johnstone | 244/130 |
| 4,216,924 A | * | 8/1980 | Fradenburgh | 244/207 |
| 4,285,482 A | * | 8/1981 | Lewis | 244/207 |
| 4,516,747 A | * | 5/1985 | Lurz | 244/204 |
| 4,749,151 A | * | 6/1988 | Ball et al. | 244/207 |
| 4,802,642 A | * | 2/1989 | Mangiarooty | 244/204 |
| 4,932,610 A | * | 6/1990 | Maestrello | 244/204 |
| 5,016,837 A | * | 5/1991 | Willis | 244/207 |
| 5,069,397 A | * | 12/1991 | Haslund | 244/207 |
| 5,297,765 A | * | 3/1994 | Hughes et al. | 244/209 |
| 5,758,823 A | * | 6/1998 | Glezer et al. | 239/4 |
| 5,938,404 A | * | 8/1999 | Dozalski et al. | 244/204 |
| 5,957,413 A | * | 9/1999 | Glezer et al. | 244/208 |

OTHER PUBLICATIONS

Rediniotis, O.K., Ko, J., Yue, X. & Kurdila, A.J., "Synthetic Jets, Their Reduced Order Modeling and Applications to Flow Control", AIAA Paper No. 99–1000, 37th Aerospace Sciences Meeting & Exhibit, Reno, NV, Jan. 12–15, 1999.*

* cited by examiner

Primary Examiner—Charles T Jordon
Assistant Examiner—Tien Dinh

(57) ABSTRACT

The nozzle of an acoustic jet directs high momentum flux gas particles essentially tangentially into the boundary layer of the flow in a diffuser, an engine air inlet, a jet engine gas flow path or on the suction surface of an airfoil, the gas particles in the chamber of the tangential acoustic jet being replenished with approaching low momentum flux particles drawn from the gas flow in a direction normal to the surface, thereby to provide a net time-averaged flow of increased momentum flux particles to defer the onset of boundary layer separation and/or reduce the thickness of the boundary layer. The acoustic jet is driven by a gas pressure oscillation generator which may be a loudspeaker, a resonant solenoid piston, a cranked piston, or the like.

46 Claims, 21 Drawing Sheets

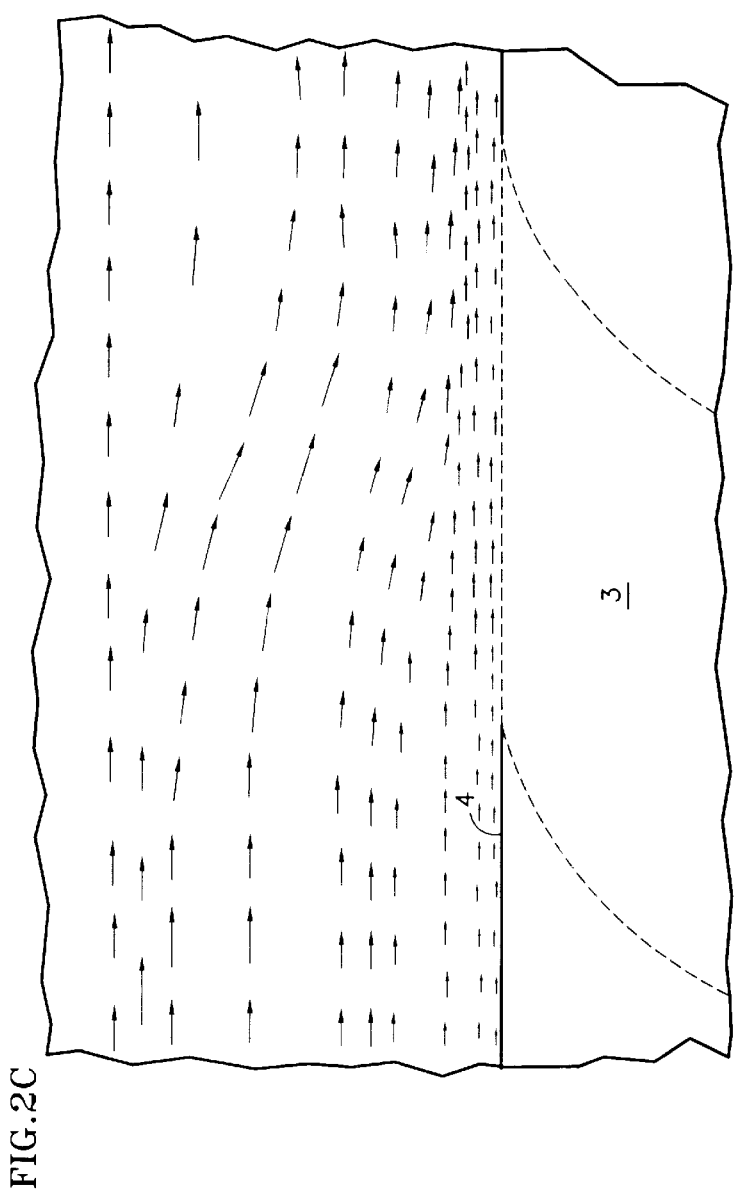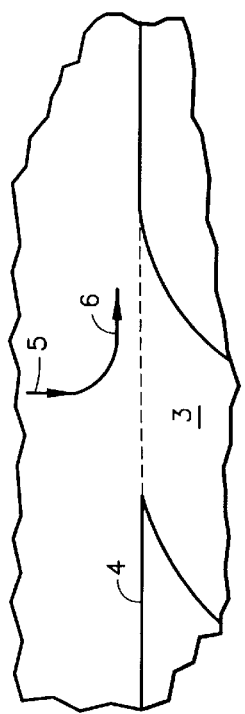
FIG.2C
FIG.2D

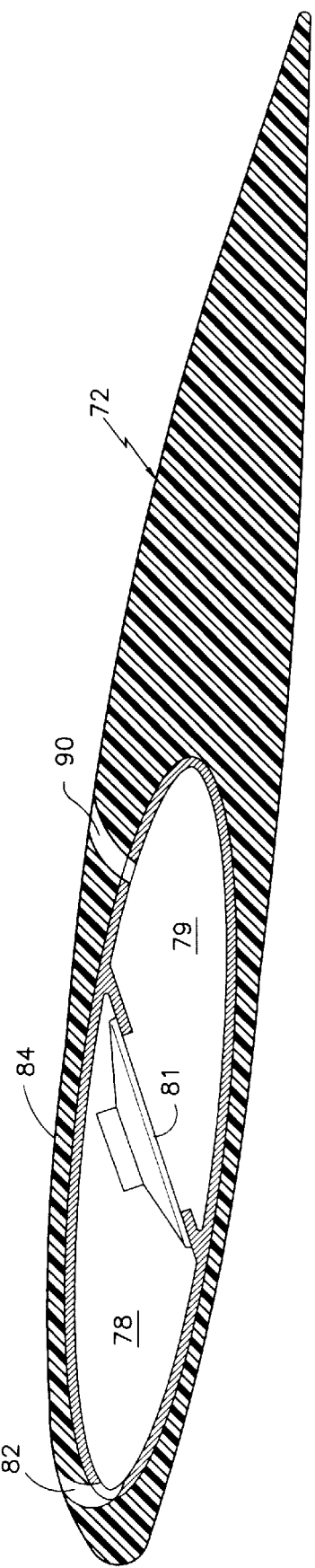
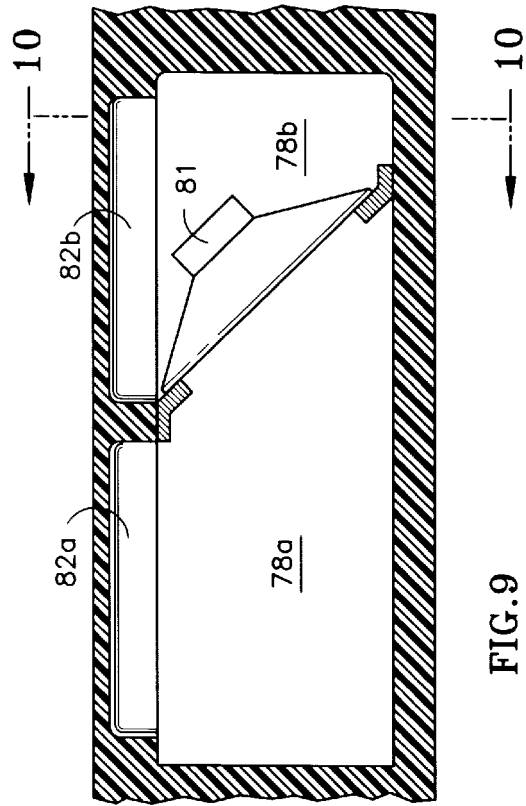
FIG. 8
FIG. 9

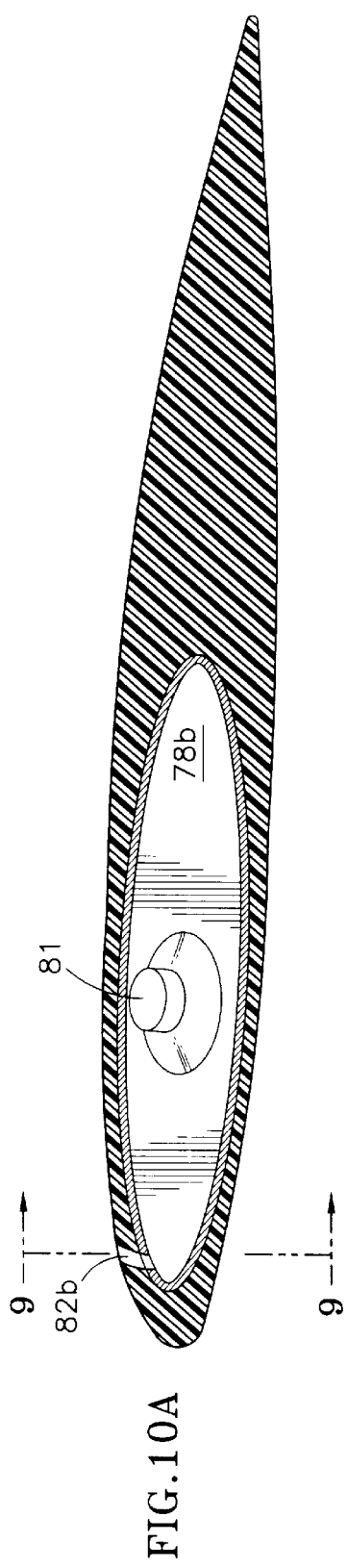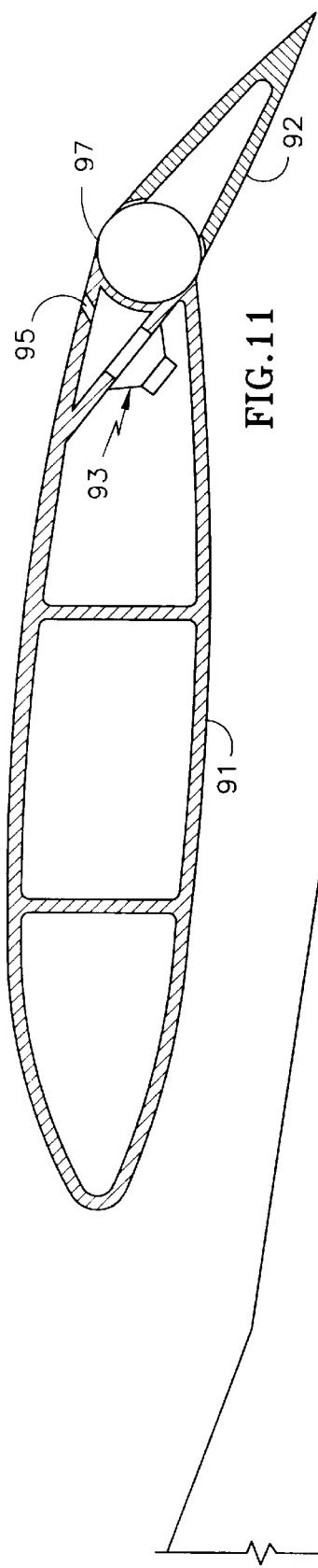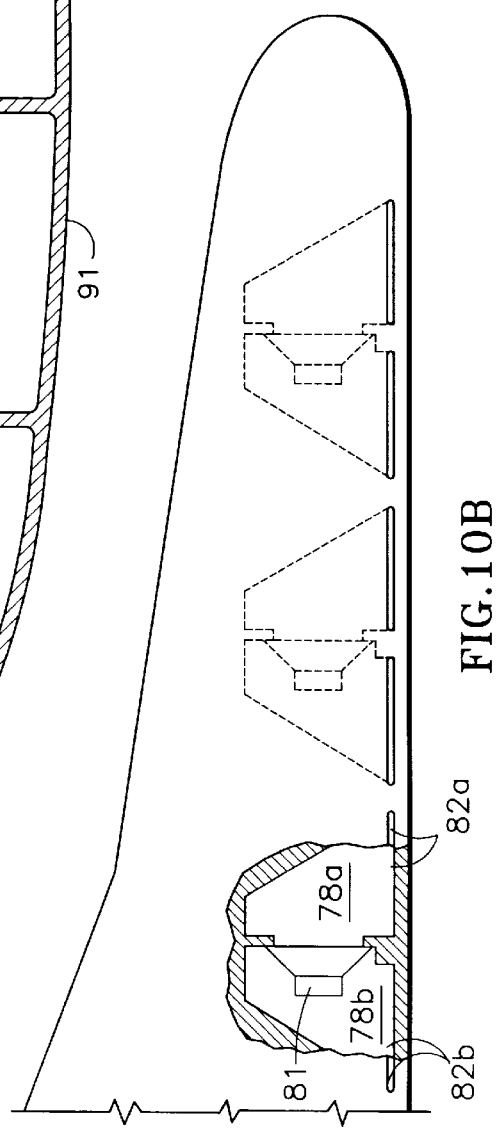

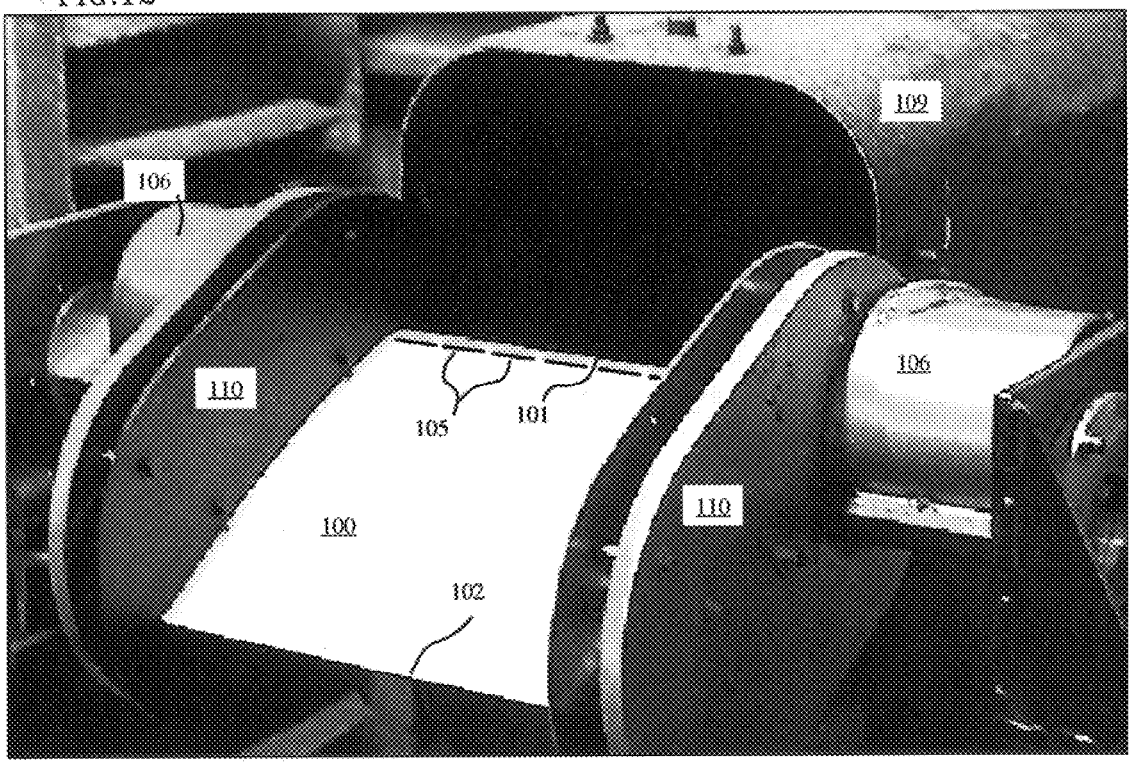

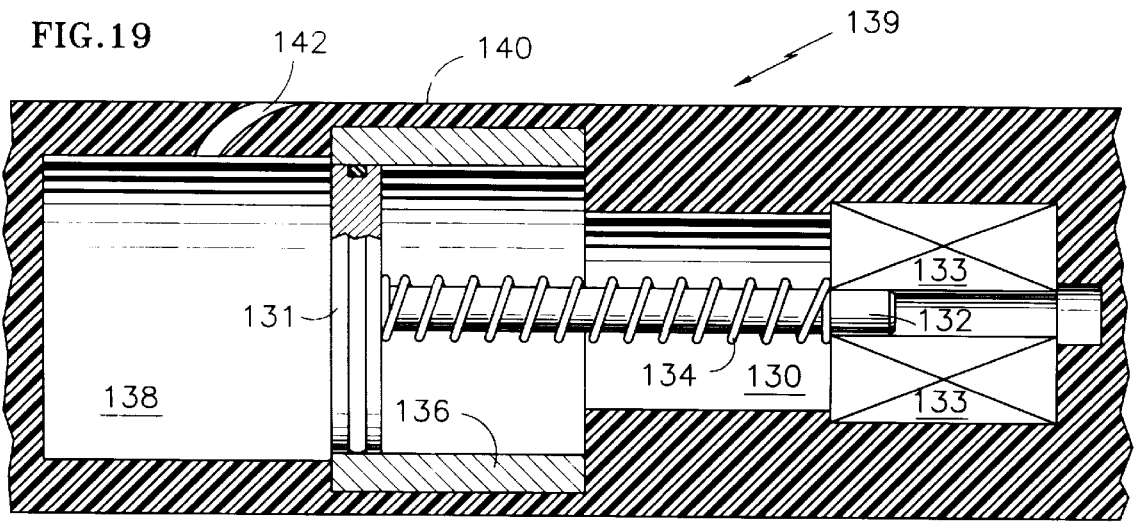
FIG. 19
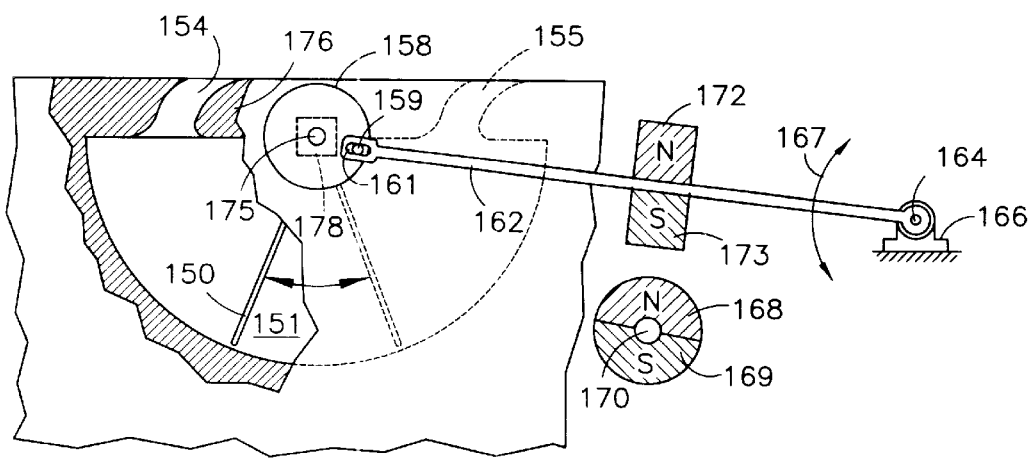
FIG. 20
FIG. 21
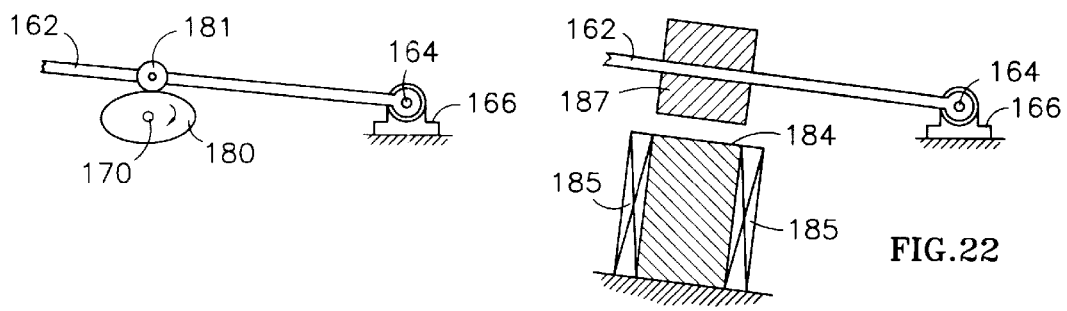
FIG. 22

TANGENTIALLY DIRECTED ACOUSTIC JET CONTROLLING BOUNDARY LAYER

CROSS REFERENCE TO RELATED APPLICATIONS

Commonly owned copending U.S. patent applications filed contemporaneously herewith, Serial Nos. 09/257,563, 09/257,483 and 09/257,564, contain subject matter related to that disclosed and claimed herein.

TECHNICAL FIELD

This invention relates to an acoustic jet having a nozzle directed essentially tangentially downstream into a flow of gas along a surface to control the boundary layer thereof.

BACKGROUND ART

Boundary layer separation is a fundamentally limiting mechanism which constrains the design of gas flow systems. As an example, it is known in the helicopter art that retreating blade stall (boundary layer separation from the leading edge of the rotor blade) establishes limits on rotor load and flight speed. In addition to the loss of capability to generate lift, unsteady blade stall transmits very large impulsive blade pitching moments to the flight control system. In order to prevent excess control loads, stall boundaries are set as a function of rotor load and flight speed. Stall boundaries define the maximum blade loads, which impact maneuverability and agility as well as speed and payload. Similar boundary layer separation problems affect diffusers, fans in air moving equipment and jet engines, airplane wings, other airfoils, fuselages, flow ducts, and other structures having surfaces with aerodynamic profiles.

Gas flow in the boundary layer adjacent to a surface exhibits a reduction in velocity due to friction of the molecular viscosity interacting with the surface, which results in a strong velocity gradient as a function of perpendicular distance from the wall: from zero at the surface, raising to mainstream velocity at the outer edge of the boundary layer. The reduced velocity results in a lower momentum flux, which is the product of the density of the gas times the square of its velocity. This near-wall, low-momentum fluid can be problematic for the case where the static pressure rises along the direction of the flow. For example, along a diverging surface (that is, a surface that tails away from the mean flow direction), as is the case in a diffuser and on the suction side of an airfoil such as a fan blade or an airplane wing, the flow along the surface is accompanied by a pressure rise, which is accomplished only by conversion of momentum flux. If the pressure rise is sufficiently large, the momentum and energy of the gas along the surface is consumed in overcoming this pressure rise, so that the gas particles are finally brought to rest and then flow begins to break away from the wall, resulting in boundary layer separation (FIG. 1A). Boundary layer separation typically results in the termination of pressure rise (recovery) and hence loss in performance (e.g., airfoil lift) and dramatic decrease in system efficiency, due to conversion of flow energy into turbulence, and eventually into heat. It is known that boundary layer separation can be deterred by increasing the momentum flux of the gas particles flowing near the surface. In the art, the deterrence or reduction of boundary layer separation is typically referred to as "delaying the onset of boundary layer separation".

The simplest and most common method for reducing boundary layer separation includes small vortex generators, which may typically be tabs extending outwardly from the surface (such as the upper surface of an airplane wing), which shed an array of streamwise vortices along the surface. The vortices transport the low momentum particles near the surface away from the surface, and transport the higher momentum particles flowing at a distance from the surface toward the surface, thereby improving the momentum flux of particles flowing near the surface in the boundary layer downstream of the tabs. This has the effect of deterring boundary layer separation at any given velocity and over a range of angle of attack (where the uncontrolled separation is downstream of the vortex generators). However, as is known, tab-type vortex generators create parasitic drag which limits the degree of boundary layer separation that can be efficiently/practically suppressed.

Another known approach employs continuous flow into or out of the boundary layer. A wall suction upstream of the boundary separation line (that is, the line at which the onset of full boundary layer separation occurs across the surface of an airfoil or a diffuser) simply removes low momentum flux gas particles from the flow adjacent to the surface, the void created thereby being filled by higher momentum flux gas particles drawn in from the flow further out from the surface. A similar approach is simply blowing high energy gas tangentially in the downstream direction through a slot to directly energize the flow adjacent to the surface. Both of these flow techniques, however, require a source of vacuum or a source of pressure and internal piping from the source to the orifices at the surface, which greatly increases the cost, weight and complexity of any such system. These techniques have not as yet been found to be sufficiently effective to justify use over a wide range of applications.

A relatively recent approach, so-called "dynamic separation control" uses perturbations oscillating near the surface, just ahead of the separation point, as are illustrated in U.S. Pat. No. 5,209,438. These include: pivotal flaps which oscillate from being flush with the surface to having a downstream edge thereof extending out from the surface, ribbons parallel to the surface, the mean position of which is oscillated between being coextensive with the surface and extending outwardly into the flow, perpendicular obstructions that oscillate in and out of the flow, and rotating vanes (microturbines) that provide periodic obstruction to the flow, and oscillatory blowing. These devices introduce a periodic disturbance in vorticity to the flow, the vortices being amplified in the unstable separating shear layer into large, spanwise vortical structures (see FIG. 1B) which convect high momentum flow toward the surface, thereby enabling some pressure recovery. It is consistently reported in the relevant literature that at least two large coherent vortical structures must be present over the otherwise separated region for the control to be effective. Such a flow is neither attached nor separated, under traditional definitions. However, such perturbations must be actively controlled as a function of all of the flow and geometric parameters, dynamically, requiring expensive modeling of complex unsteady flow structures and/or significant testing to provide information for adapting to flow changes either through open loop scheduling or in response to feedback from sensors in the flow.

A recent variation on the dynamic separation control is the utilization of a so-called "synthetic" jet (also referred to as "acoustic jet" or "streaming") directed perpendicular to the surface upstream of the boundary separation line of the surface. This approach has been reported as being highly parameter dependent, thus also requiring dynamic control; and, the results achieved to date have not been sufficient to merit the cost and complexity thereof in any product or practical application. In Redinotis et al, "Synthetic Jets, Their Reduced Order Modeling and Applications to Flow Control", AIAA 99-1000, presented at 37th Aerospace Sciences Meeting & Exhibit, Reno, Nev., Jan. 28, 1999, a laminar flow of water (Reynolds number=6600) flowing around a half-cylinder used a tangential synthetic jet which induced natural instability of the shear layer, leading to large vortical coherent structures of the type referred to with respect to FIG. 1B, hereinbefore, which promoted mixing and momentum flux exchange between the inner and outer parts of the boundary layer. As stated therein, the process takes advantage of the Coanda effect. That requires significant local surface curvature in the vicinity, and particularly downstream, of the point of injection of the synthetic jet. Although flow separation was delayed somewhat, it was not eliminated, as shown in FIG. 17(C) therein.

DISCLOSURE OF INVENTION

Objects of the invention include: absolute adherence of a boundary layer of laminar or turbulent gaseous flow to an adjacent surface; improved boundary layer characteristics in turbulent flow; reduced boundary layer thickness; improved deterrence of gas flow boundary layer separation; increased efficiency of gas flow machinery; improved helicopter stability; improved effectiveness of fan, helicopter rotor and other blades, wings, other airfoils, fuselages and other aerodynamic structures; boundary layer control which is effective, efficient, having moderate initial cost and low operating costs; and boundary layer control which is relatively simple and provides little parasitic impact on the host structures and systems.

This invention is predicated in part on the fact that the outflowing jet stream of an acoustic jet will clear the orifice or nozzle area sufficiently before the onset of negative pressure, which therefore will cause replenishment of gas mass within the jet cavity with molecules which are other than those in the emitted jet stream, specifically, the low momentum molecules of the approaching boundary layer. This invention is also predicated in part on our discovery that an acoustic jet directed tangentially into a boundary layer of a turbulent gaseous flow will produce a net negative flow averaged over time which is generally perpendicular to the surface and a net positive flow averaged over time which is generally parallel to the surface.

According to the present invention, an acoustic jet directed at a low angle of incidence into the boundary layer of a turbulent gaseous flow provides pulses of high momentum flux particles, which are essentially the previously ingested low momentum flux particles that have been accelerated, injected substantially tangentially into the boundary layer to cause, in the region downstream of the tangential acoustic jet, an essentially steady streamline flow with the boundary layer absolutely attached to the surface. In one application of the invention, the acoustic jet is directed at a low angle of incidence in the vicinity of the boundary layer separation point of a diffuser, a flap, an airfoil, or other aerodynamic profile thereby to deter or prevent boundary layer separation. In further accord with the invention, the jet may be located at the entrance to a diffuser or at the edge of a bluff body to deter or prevent boundary layer separation.

The negative pressure portion of the acoustic jet cycle (instroke, FIG. 2A) creates a flow of low momentum flux gas particles perpendicular to the surface, entering the chamber, thereby removing low momentum flux gas particles from the approaching boundary layer, such particles being injected essentially tangentially into the boundary layer during the positive pressure portion of the acoustic jet cycle (outstroke, FIG. 2B) to provide adequate momentum flux in the boundary layer, to deter the onset of boundary layer separation downstream thereof, including (with adequate drive) absolute adherence to the adjacent surface. This action of the tangential acoustic jet of the present invention energizes the boundary layer on both the instroke and outstroke, the time average of which is shown in FIG. 2C, making the boundary layer resistant to separation during both strokes, thereby completely preventing separation. The tangential acoustic jet totally suppresses separation without the introduction of large coherent structures. In addition, the most effective frequency for the tangential acoustic jet of the present invention corresponds to a frequency where particle displacement in the nozzle is the largest, relating to acoustic streaming parameters, and occurs at low frequencies where the actuator output is designed to be maximal; this is in contrast to the dynamic separation control of the prior art (hereinbefore) in which the frequency directly depends on flow speed, length of separation, and approaching boundary layer characteristics.

The invention may be practiced utilizing cavities in which the acoustic forcing energy is applied through a resilient member or a rigid member acting as a wall of the cavity, the member being vibrated by electric, magnetic or mechanical forcing, to induce pressure oscillations in the gas at an effective frequency, such as a loudspeaker, preferably with a high Q (quality factor, a measure of mechanical losses) centered at an effective frequency for boundary layer control, or other electroacoustic or mechanoacoustic transducer, such as simple vibrators attached to diaphragms or pistons, powered by rotary or linear devices, piezoelectric drivers, and the like.

In contrast with all of the prior art, the frequency of excitation of the tangential acoustic jet of the present invention is essentially unrelated to the flow and the surface (that is, independent of flow speed, length of separation and approaching boundary layer characteristics), and is, instead, a function of the characteristics of the acoustic jet itself, including the actuator resonant frequency. A selected frequency for the invention is one which will provide the highest conversion of input power to flow output power. As described by Ingard, U. "On the Theory and Design of Acoustic Resonators", Journal of the Acoustical Society of America, Vol. 25, No. 6, Nov. 1953, the amplitude of excitation of the acoustic jet must be high enough so that the gas particles separate from the orifice region, roll up into ring vortices and convect away, forming the mainstream of flow, or synthetic jet. However, the effect achieved by a tangential acoustic jet in accordance with the invention is not frequency dependent, and the frequency of the jet is wholly independent of the flow which the jet is being used to control. When the gas is air, a suitable frequency may be on the order of 20 Hertz to several hundred Hertz. Other frequencies may be used to suit any particular implementation of the present invention. The amplitude for a given frequency must be high enough with tangential injection of the particles into a flow, to ensure that gas particle displacement through the nozzle is sufficient to prevent the particles from being re-entrained into the slot.

The invention is particularly advantageous since the acoustic frequency may remain fixed for flows having Reynolds numbers ranging from a few hundred to several million in contrast with any prior methodology. It is a unique solution for flows with Reynolds numbers exceeding the critical value above which the flow is turbulent.

In accordance with the invention, the nozzle is directed at as small an acute angle to the boundary layer as is practicable, referred to herein as "substantially tangential"; the angle may range from near zero degrees to about forty degrees, when necessary, while still obtaining some of the benefits of the invention.

Other objects, features and advantages of the present invention will become more apparent in the light of the following detailed description of exemplary embodiments thereof, as illustrated in the accompanying drawings.

BRIEF DESCRIPTION OF THE DRAWINGS

FIG. 2C is a fanciful illustration of the time average effect of the flows illustrated in FIGS. 2A and 2B.

FIG. 2D is an illustration of flow effects of the invention.

FIG. 8 is a sectioned, side elevation view of an airfoil employing a two-chamber, two-nozzle embodiment of the present invention.

FIG. 9 is a partial, front sectional view of a two-chamber, two-slot embodiment of the invention, with the slots separated spanwise, taken on the line 9—9 of FIG. 10.

FIG. 10A is a sectioned, side elevation view of a helicopter blade employing the two-chamber, two spanwise slots, taken on the line 10—10 in FIG. 9.

FIG. 10B is a partial, partially sectioned top plan view of a wing using the embodiment of FIG. 9.

FIG. 11 is a simplified, stylized, sectioned, side elevation view of a wing with a flap employing the invention.

FIG. 12 is a photograph of a test rig having tangential acoustic jets according to the invention, in which boundary layer flow control of the invention for various momentum coefficients is illustrated in FIGS. 13–18.

FIG. 19 is a partial, partially sectioned side elevation view of an alternative form of an electroacoustic gas pressure oscillation generator.

FIG. 20 is a partial, partially sectioned, side elevation view of a mechanoacoustic gas pressure oscillation generator.

FIGS. 21 and 22 are partial, partially sectioned, side elevation views of alternative variations of the generator of FIG. 20.

BEST MODE FOR CARRYING OUT THE INVENTION

Figure 1A:
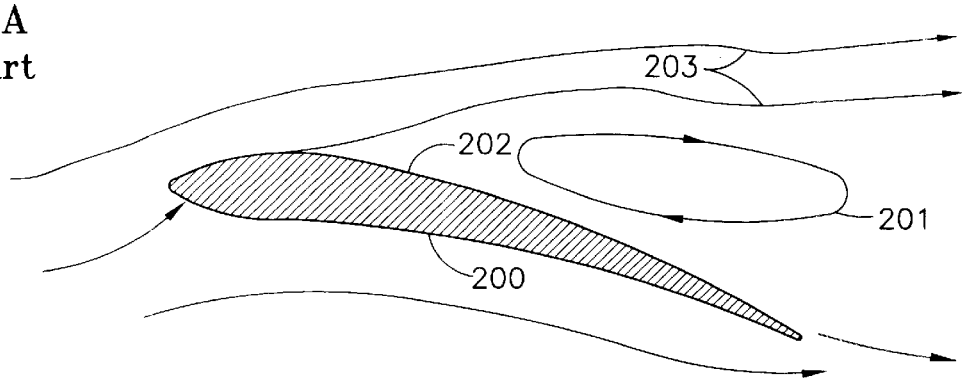
FIG. 1A is a stylized, side elevation section view of an airfoil of the prior art having no boundary layer control, illustrating a separation bubble and turbulence adjacent to the suction surface thereof.
Figure 1B:
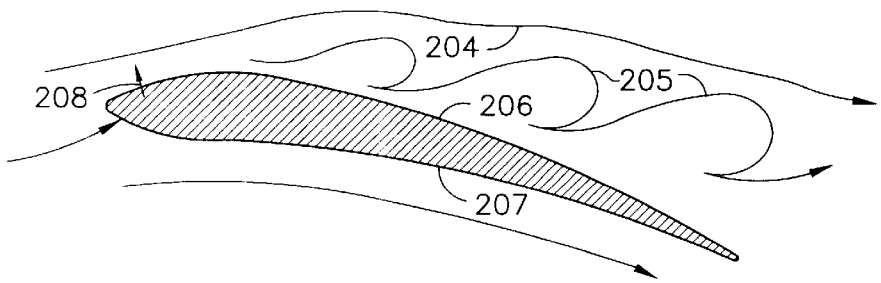
FIG. 1B is a stylized, side section view of an airfoil, with forcing of the prior art, illustrating vortical structures and unsteady flow adjacent to the suction surface thereof.
Figure 1C:
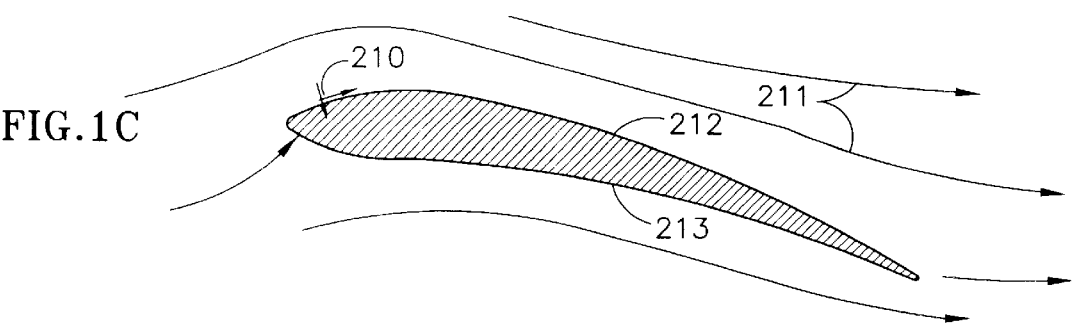
FIG. 1C is a stylized, side elevation section of an airfoil with an acoustic jet of the present invention, illustrating steady, substantially streamline flow adjacent the suction surface thereof.

FIG. 1A illustrates an airfoil 200 operating in conditions with severe boundary layer separation, with no boundary layer control. FIG. 1A illustrates severe boundary layer separation, including a bubble 201 adjacent the suction surface 202 of the airfoil 200, together with unsteady flow 203. FIG. 1B illustrates unsteady flow 204 and the vortical structures 205 which form adjacent the suction surface 206 of an airfoil 207 in response to typical forcing, illustrated by arrow 208, applied near the point of onset of boundary layer separation, utilizing the dynamic separation control technique of the prior art described hereinbefore. This is in contrast with the present invention illustrated in FIG. 1C by arrows 210, in which an essentially steady streamline flow 211 is achieved on the airfoil in the region downstream of the tangential acoustic jet (210) with the boundary layer absolutely attached to the surface 212 of the airfoil 213, as described hereinafter.

Figure 2A:
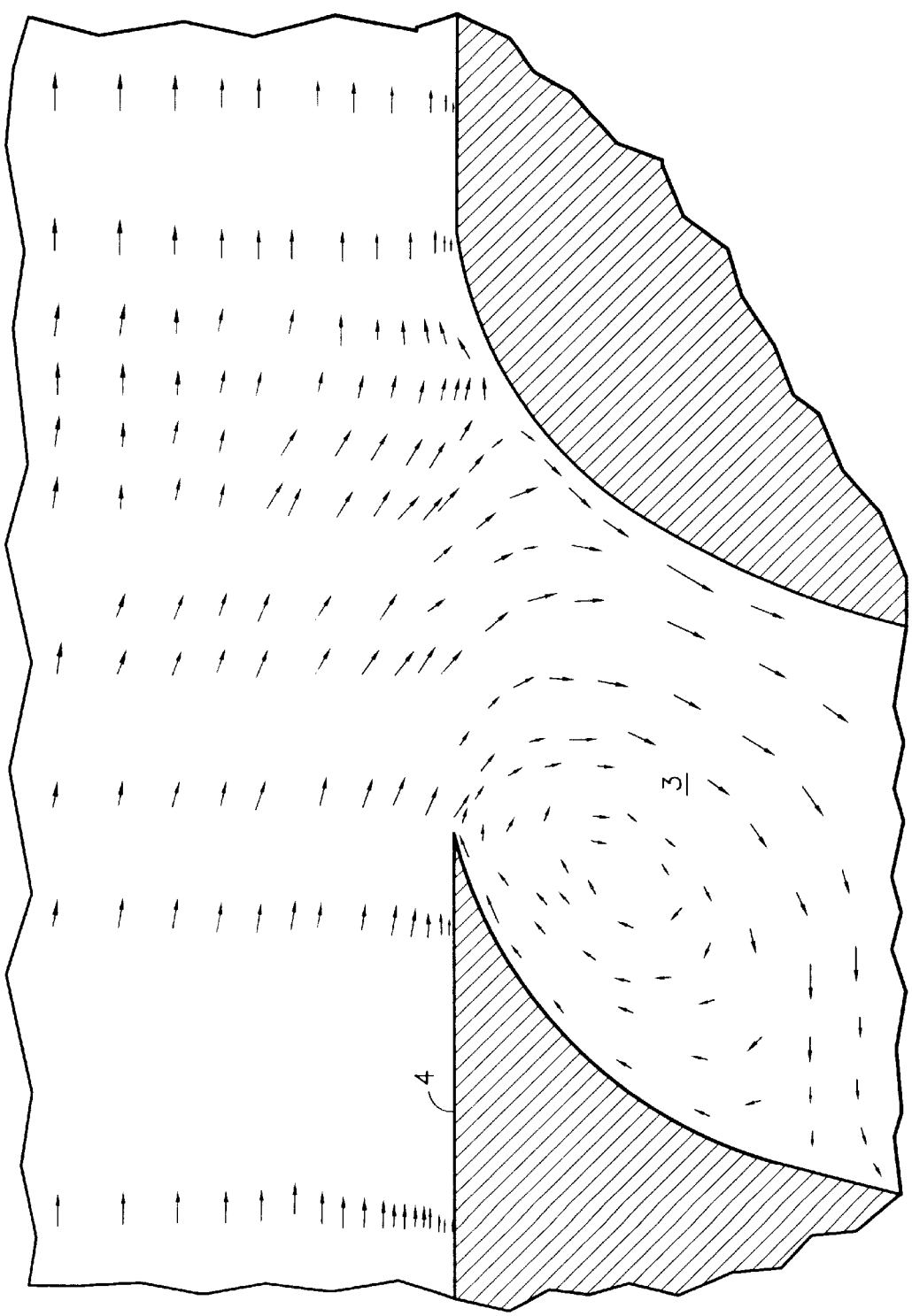
FIG. 2A is a partial, partially sectioned side elevation view of a tangential acoustic jet of the invention with fanciful illustrations of particle velocity vectors during the instroke portion of a cycle.
Figure 2B:
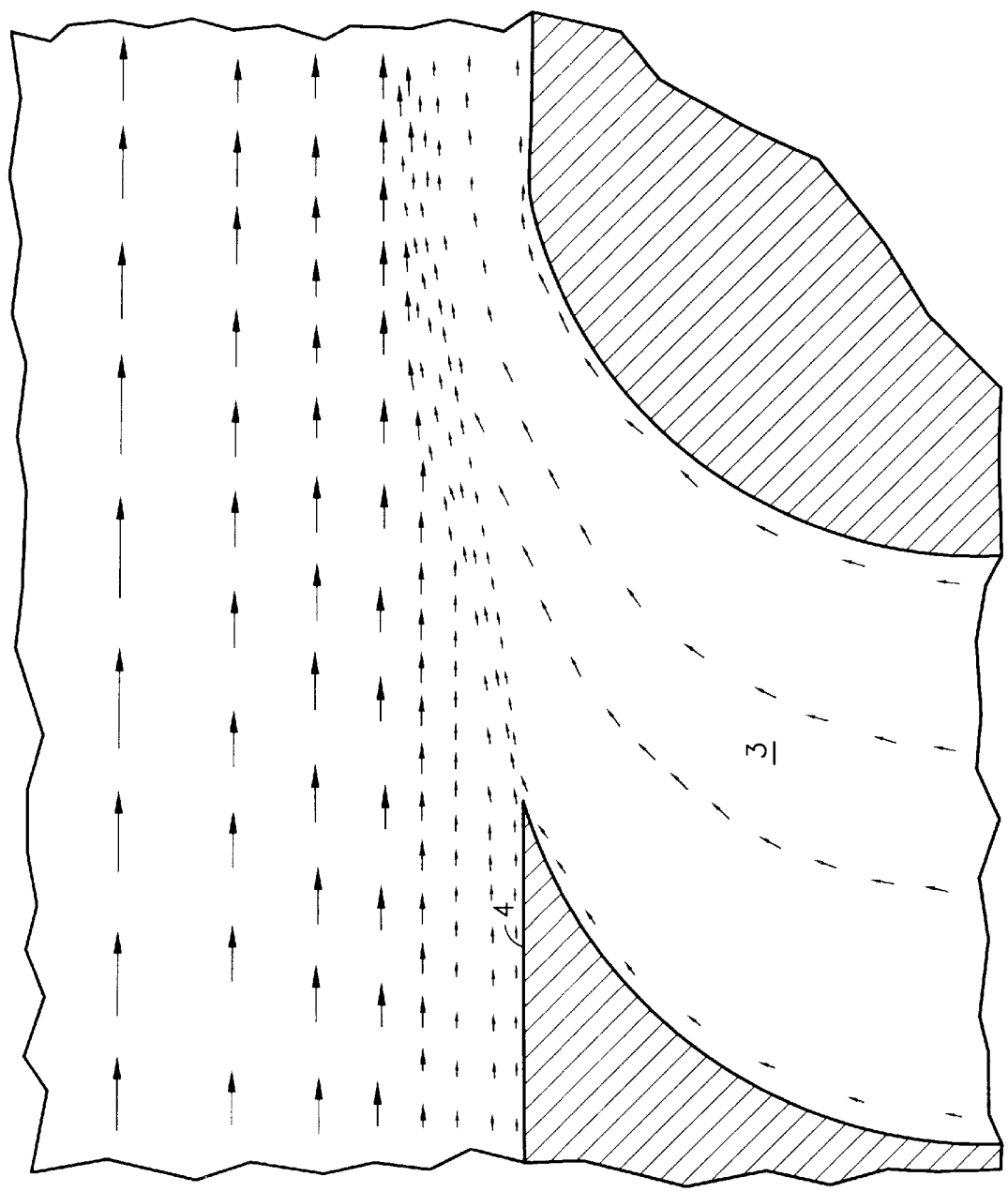
FIG. 2B is a partial, partially sectioned side elevation view of a tangential acoustic jet of the invention with fanciful illustrations of particle velocity vectors during the outstroke portion of a cycle.

FIGS. 2A–2C illustrate the present invention. In FIG. 2A, the arrows approximately represent velocity vectors of air particles in the flow, based on a conventional CFD (computational fluid dynamics) calculations. The length of the vectors relate approximately to the magnitude of velocity, whereas the direction of the vectors relate to the direction of flow. In FIG. 2A, the nozzle 3 of a tangential acoustic jet according to the present invention is directed substantially tangentially with respect to the surface or wall 4, adjacent to which is a gas flow which, without the present invention, would suffer severe boundary layer separation. FIG. 2A depicts the intake portion of a cycle in which the acoustic jet is drawing gas particles into the nozzle 3, such particles being drawn from the low axial momentum flux particles adjacent the wall 4. In FIG. 2B, the outflow portion of the cycle of a tangential acoustic jet of the present invention is illustrated. It is seen that the particles being projected into the flow from the nozzle 3 are traveling substantially tangentially, thereby being essentially parallel with the upstream flow. Not only are the particles accelerated by the jet within the nozzle 3 of substantial axial momentum, but some of that momentum is transferred to other particles in the flow as the jet outflow mixes with the main flow adjacent the surface 4. Thus, the particles removed from near the wall, which have very low axial momentum flux, as seen in FIG. 2A, are returned to the flow, as seen in FIG. 2B with substantially increased momentum flux. The net effect is roughly illustrated in FIG. 2C in which the invention is shown to achieve, on average over time, as a consequence of the effect of the intake of FIG. 2A and the outflow of FIG. 2B, not only to impart higher momentum flux to the particles flowing along the wall, but also move particles having momentum flux some distance from the wall, closer to the wall so as to improve the momentum flux adjacent the wall. The net effect, as seen in FIG. 2D, is a migration of high momentum particles from the flow away from the wall toward the wall, as seen by the arrow 5, as well as in increase in velocity (momentum flux) of particles along the wall as shown by the arrow 6.

Figure 2E:
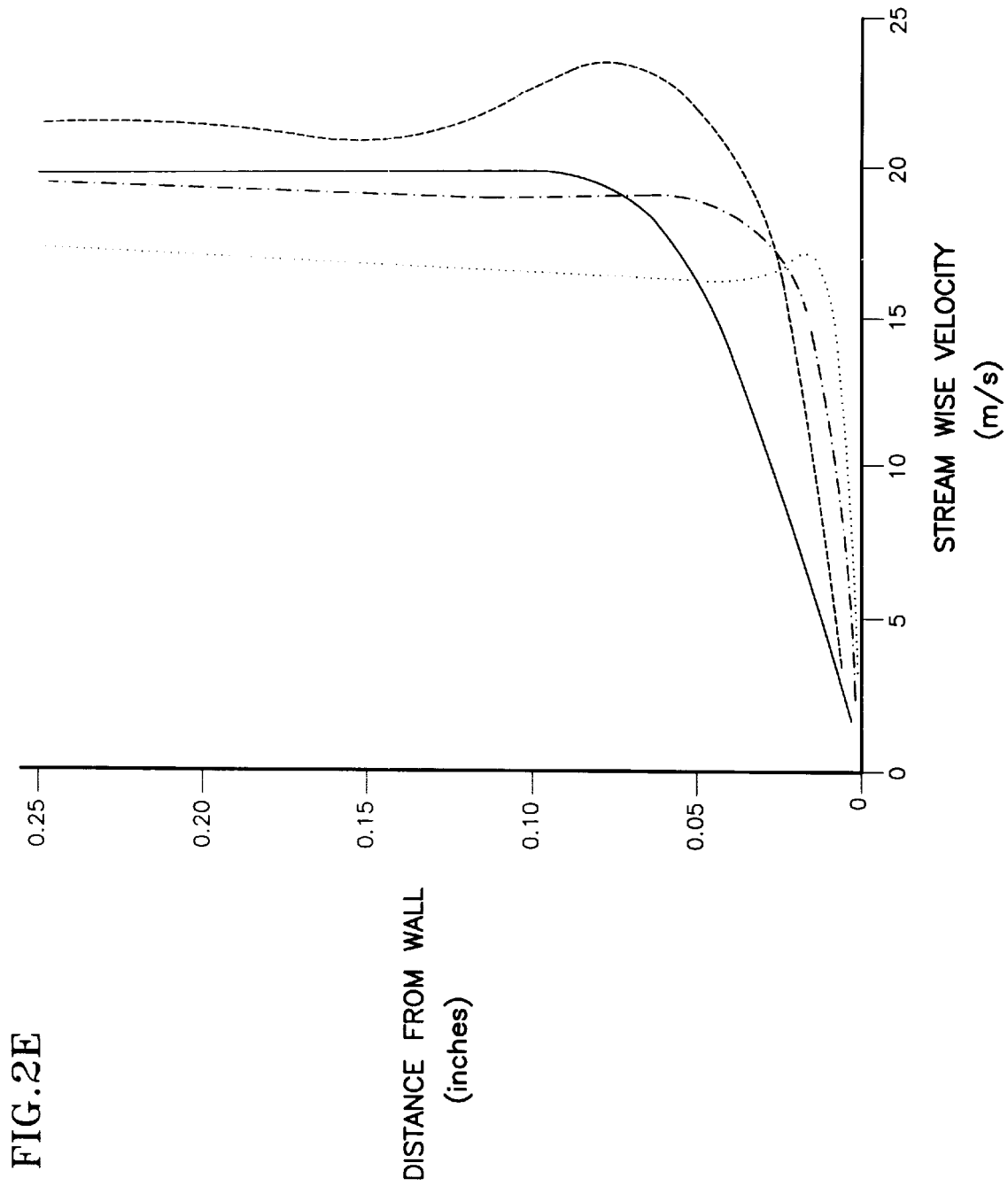
FIG. 2E is a plot of velocity as a function of distance from the wall during the instroke, outstroke and on average, in contrast with a flow not utilizing the invention.

In FIG. 2E, the dotted line illustrates the streamwise velocity of particles as a function of distance from the wall during the negative pressure or instroke portion of the cycle (as in FIG. 2A); the dashed line illustrates the streamwise velocity of the particles as a function of distance from the wall during the positive pressure or outstroke portion of the cycle (as in FIG. 2B). The time average streamwise velocity as a distance from the wall is shown in FIG. 2E by the dot-dash line. This result is in contrast with the velocity as a function of distance from the wall in a flow not utilizing any boundary layer separation control, as illustrated by the solid line in FIG. 2E. Thus the invention provides adequate streamwise velocity significantly closer to the wall.

Figure 3:
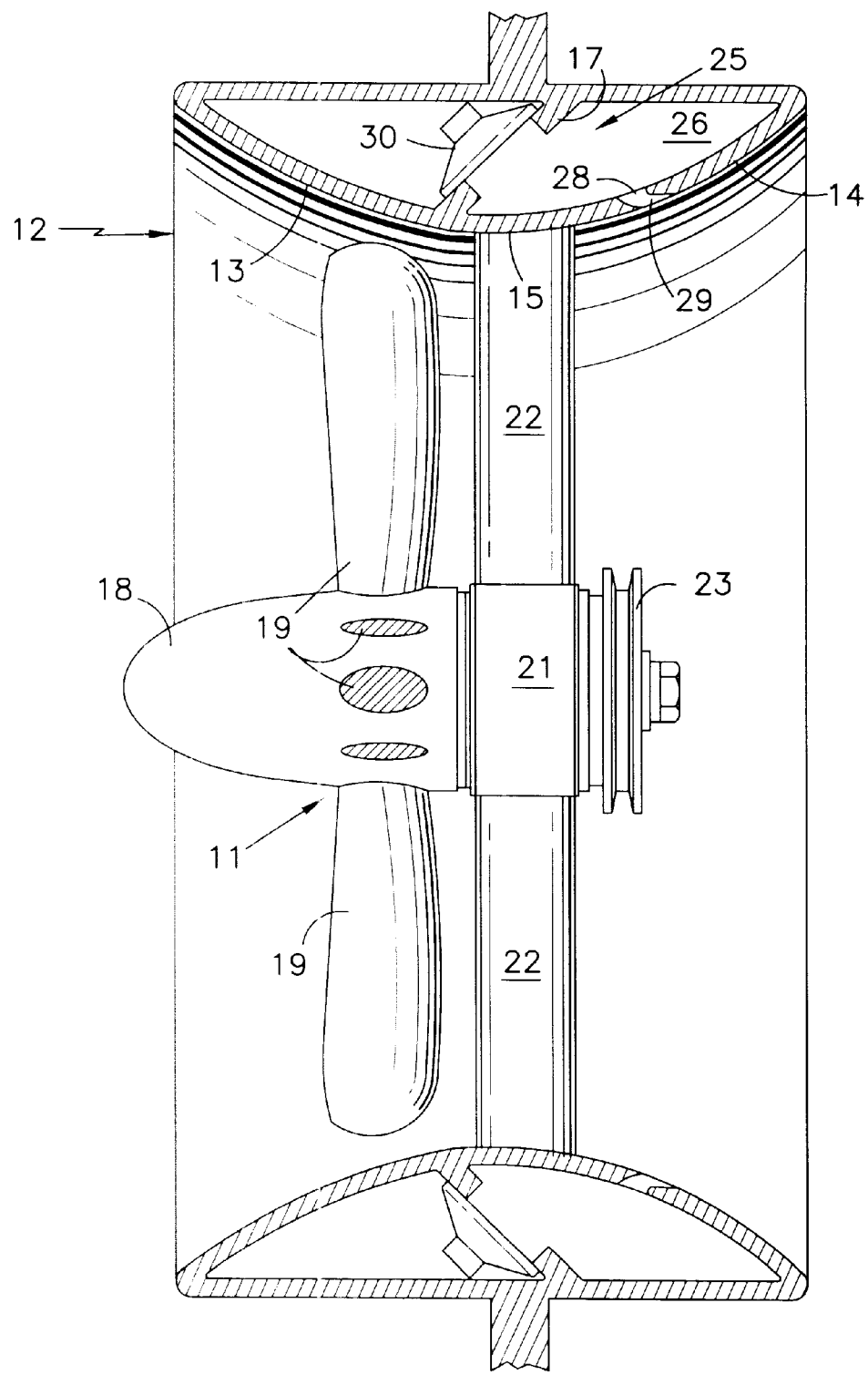
FIG. 3 is a partial, stylized, partially sectioned side elevation view of a vane-axial fan feeding a diffuser and employing a tangential acoustic jet according to the invention.

Referring to FIG. 3, one application for this invention is a vane-axial fan 11 disposed within an inter-plenum shroud 12 which has a converging section 13 and a diverging section 14 so as to form a throat 15. The converging section 13 is irrelevant to the invention, and shown by way of example only. The fan is conventional, having a hub 18 with a plurality of blades 19 thereon, being suitably journaled to a hub 21 supported by flow-straightening vanes 22 (only two of which are shown, although more are typically used). The fan 11 may be driven in a conventional way, such as by means of a belt driving a pulley 23 or a hub-mounted motor (not shown). The fan 11 and its drive are irrelevant to the present invention, being an example merely of an airflow system which may use a tangential acoustic jet according to the present invention, thereby causing the flow system to operate more efficiently.

In accordance with the invention, an acoustic jet 25 comprises a chamber 26 formed by a suitable shroud 27, the chamber having a nozzle 28 at an extreme acute angle with respect to the surface of the throat 15, with an orifice 29 formed in the end of the nozzle 28 at the surface of the throat 15, just upstream of the boundary layer separation point. The acoustic jet 25 is driven by one or more gas pressure oscillation generators 30 which are shown in FIG. 3 as ordinary loudspeakers, but which may take other forms as described hereinafter. The frequency of oscillation is selected to provide the highest conversion of input power to jet output flow power. Normally, for any given combination of chamber, nozzle and gas pressure oscillation generator, the frequency can be fixed, typically between 40 Hz and 500 Hz, but the selected frequency could be tunable in some instances. In the figure, the orifices 29 are only shown in the upper and lower cross sections of the throat 15 for clarity. However, a plurality of separate annular segment chambers, or one complete annular chamber, with nozzles spaced about the throat 15, are required. Each separate chamber 26 (if such are used) requires one or more gas pressure oscillation generators 30, unless each generator serves two chambers as described hereinafter. The nozzles 28 and orifices 29 may be slot-shaped, or circular, closely spaced about the periphery of the shroud 12, just upstream of the boundary layer separation point, (which is somewhere downstream of the throat 15). The orifices 29 may also be located further downstream than the vicinity of the separation point.

Figure 4:
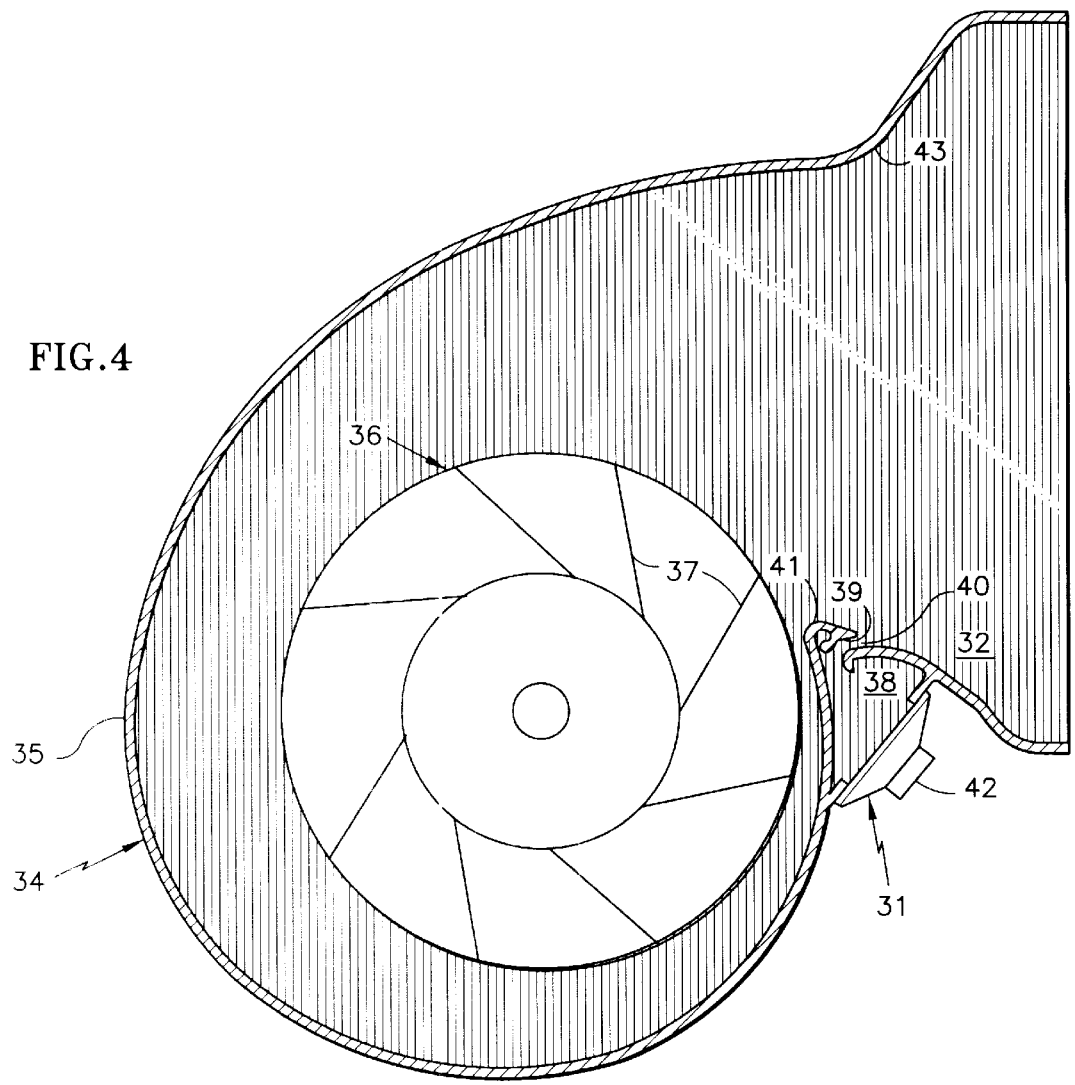
FIG. 4 is a partially sectioned, side elevation view of a centrifugal fan employing a tangential acoustic jet according to the invention.
Figure 5:
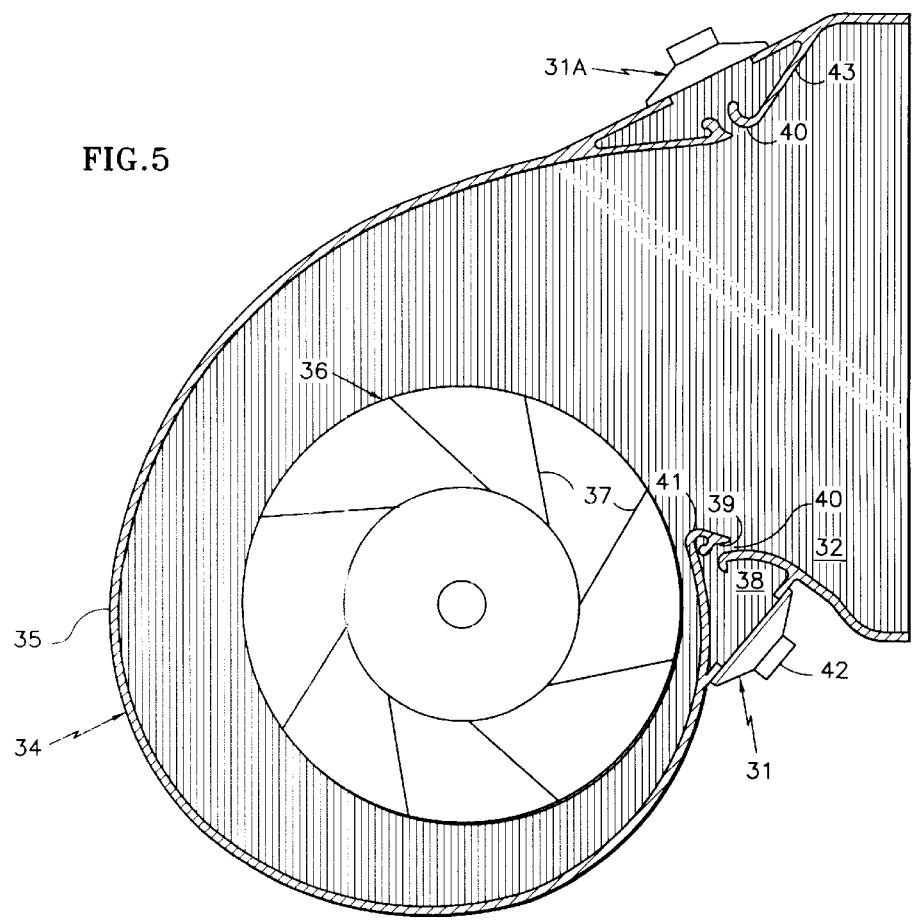
FIG. 5 is a partially sectioned, side elevation view of a centrifugal fan employing plural tangential acoustic jets of the invention.

In FIG. 4, the tangential acoustic jet 31 of the invention is embodied at the entrance to a diffuser 32 of a centrifugal fan 34 having a volute (or scroll) 35 and a rotor 36 with blades 37. In accordance with the invention, a chamber 38 has a nozzle 39 feeding an orifice 40. The orifice 40 is located at the point where boundary layer energization is most effective, which may be just downstream of the cut-off 41 as shown in FIG. 4, or somewhat further downstream therefrom. The energy of oscillatory pressure variations, created by a gas pressure oscillation generator 42, is converted into high momentum flux of the gas particles which are directed tangentially into the boundary layer at the orifice 40. In FIG. 4, no boundary layer separation control is required at the diffusion surface 43 on the opposite side due to the much stronger flow on that side as a function of the characteristics of the pump 34. However, if desired, a slightly different embodiment of the invention shown in FIG. 5 may have a tangential acoustic jet 31A to control boundary layer separation of a diverging wall 43 of the diffuser 32.

Figure 6:
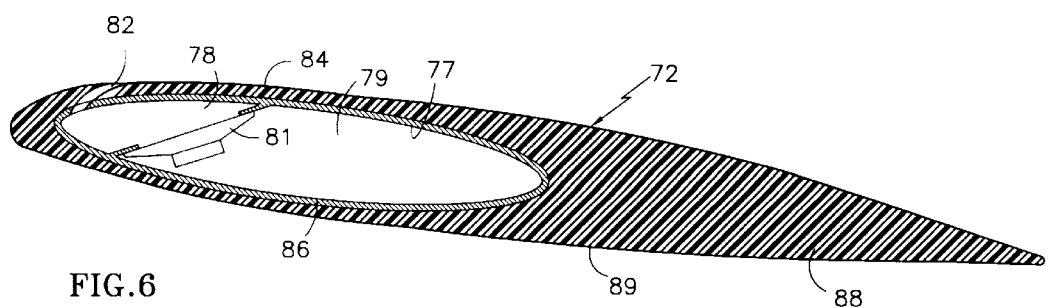
FIG. 6 is a sectioned, side elevation view of an airfoil, which may be a wing or a helicopter or fan blade, employing a tangential acoustic jet of the invention.
Figure 7:
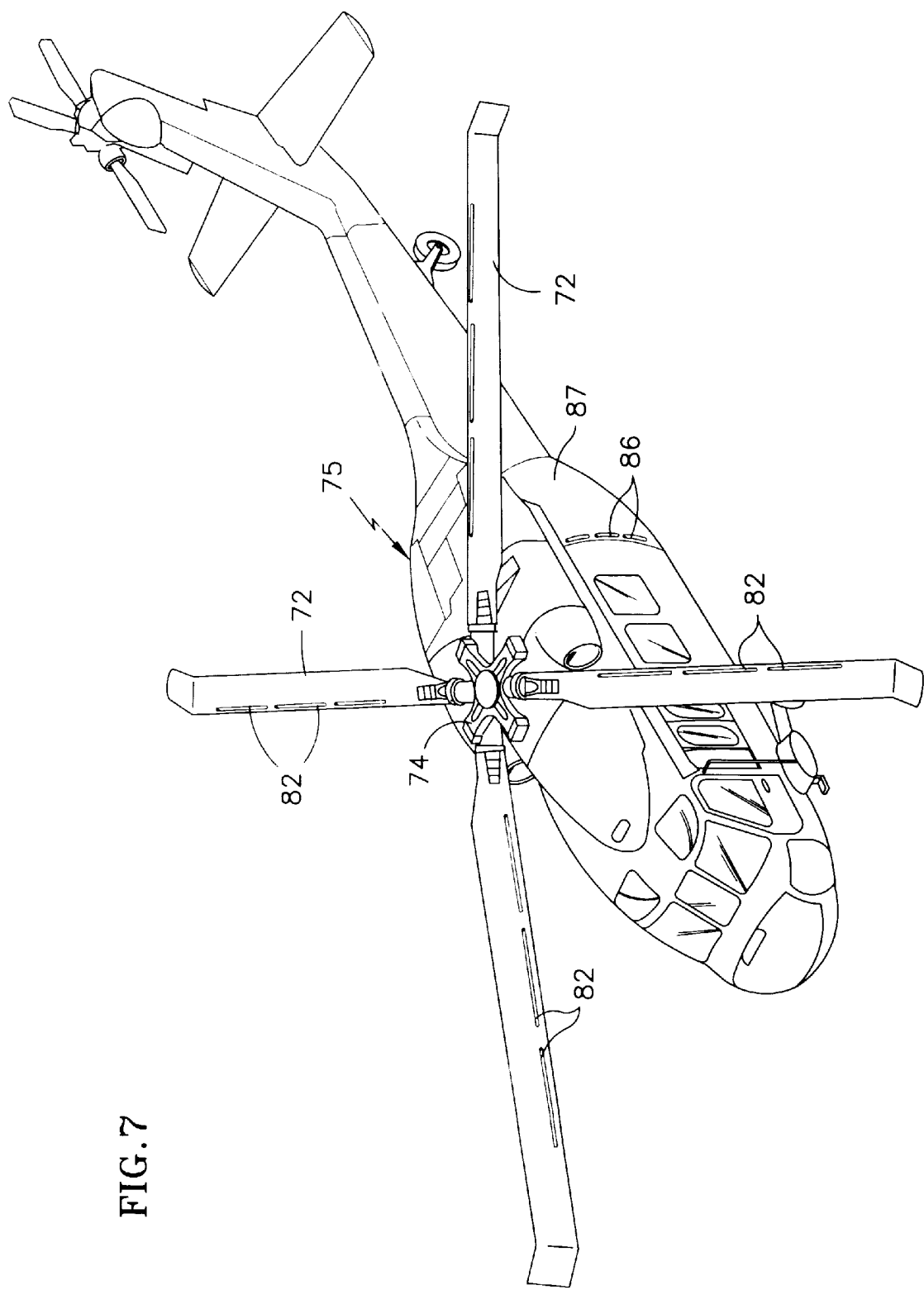
FIG. 7 is a perspective view of a helicopter employing tangential acoustic jets of the invention.

Referring to FIGS. 6 and 7, airfoils 72, which may comprise the blades 72 of the main rotor 74 of a helicopter 75, have a hollow core 77 which is separated into two chambers 78, 79 by a gas pressure oscillation generator 81. A nozzle 82 connects the chamber 78 with the suction surface 84 of the blade. The nozzle 82 is oriented at a small acute angle with respect to the suction surface 84, so that air particles will be injected substantially tangentially into the boundary layer on the suction surface 84, thereby to prevent boundary layer separation. The hollow core 77 is typically surrounded by a casing 86 and the remainder of the blade may be formed up of plastic honeycomb material 88 with a fiberglass shell on the surface 89, all as is conventional. A small bleed hole (not shown) may be provided between the chambers 78 and 79, if needed to balance the mean pressure across the speaker. In FIG. 6, other features of helicopter blades which are conventional have been omitted for clarity. As seen in FIG. 7, the slot shaped nozzles 82 may be elongated, and there may be several nozzles disposed along substantially the entire length of each blade. Structural necessity may require that the nozzles 82 be very short, or limited to a series of small holes, or other design compensation may be required to allow nozzles to penetrate the airfoil shell without impermissible structural weakness. The nozzles 82 may be farther back on the airfoil 72 than where shown in FIG. 6, depending on the actual boundary layer separation point in the operating regime of interest.

FIG. 7 also illustrates that the invention may be utilized to reduce drag by providing tangential acoustic jet slots or nozzles 82 on both sides and the bottom of a helicopter of the type illustrated in FIG. 7, at the beginning of the cross section reduction transition section 87. The slots or nozzles 82 form the nozzles of acoustic jets, which are driven by any suitable gas pressure oscillation generator, such as that described with respect to FIG. 3 hereinbefore. The use of the tangential acoustic jet of the present invention will significantly reduce form drag created by the transition section 87, and certain other bluff bodies (such as the rotor pylon of a helicopter).

As illustrated in FIG. 8, the back of the gas pressure oscillation generator may be used to drive a chamber 79 to provide mass flow through a slot 90. Therein, as the gas pressure oscillation generator 81 oscillates back and forth, a positive pressure is formed in the chamber 78 and a complementary negative pressure is formed in the chamber 79, and then vice versa, in each cycle. Therefore, the front/back orientation of the pressure oscillation generator is irrelevant in all embodiments. The chamber 78 is provided with a slot-shaped nozzle 82 and the chamber 79 is provided with a slot-shaped nozzle 90, which is downstream of the nozzle 82 on the suction surface 84. This increases the efficiency, and in the configuration of FIG. 8, will generally allow the boundary layer to be held very tightly to the surface 84 under the most adverse conditions.

Another form of the invention which utilizes both the positive pressure and negative pressure of each stroke is illustrated in FIGS. 9, 10A and 10B. Therein, a gas pressure oscillation generator 81 will produce a positive pressure wave in a chamber 78a which drives a slot-shaped nozzle 82a, and a negative pressure in a chamber 78b which drives a slot-shaped nozzle 82b that is separated spanwise (crossstream) from the nozzle 82a. Of course, each chamber of a synthetic jet could drive a plurality of nozzles, the nozzles being separated streamwise and/or spanwise from other nozzles driven by the same chamber, as well as other nozzles driven by other chambers, in any configuration within the purview of the invention.

In FIG. 11, a conventional wing 91 with an adjustable flap 92 may be fitted with a tangential acoustic jet 93 of the invention, with the nozzle 95 just upstream of the wing/flap joint 97, to deter boundary layer separation on the flap.

FIGS. 12–18 are actual digital videographs of a test rig and exemplary operation of the invention therein. Referring to FIG. 12, a test rig includes an airfoil 100 having a leading edge 101 and a trailing edge 102, with a plurality of slots 105 leading to an internal chamber (not shown) within the airfoil 100, which is in gas communication with a pair of loudspeakers which are within enclosures 106. An inlet contraction 109 conducts a gas flow (in this case air) over the surfaces of the airfoil 100 between a pair of side plates 110. In FIG. 12, the flow is from the upper right toward the lower left. Not shown in FIG. 12 is a smoke injection wand which is near the cross stream center of the flow several inches upstream of the leading edge of the airfoil 100. This wand introduces smoke into the flow so that the flow characteristics and structures become visible. In the test rig of FIG. 12, the airfoil 100 has a chord (front to back) of about 44 cm (17.3 inches), and a width between the sideplates 110 of about 51 cm (20 inches). The total height of the sideplates, above and below the airfoil, is about 41 cm (16 inches). The duct 109 is the same width as the airfoil 100, and approximately 79 centimeters (31 inches) high. There are eight slots 105, each with a streamwise width of about 0.15 cm (0.06 inch). The flow in each of the following figures was maintained at about 15 meters per second (50 fps). The loudspeakers were JBL model 500 GTI, 5 inch, 150 watt speakers, and were driven between zero watts in FIGS. 13 and 14 and 30 watts in FIG. 18, at a frequency near the 50 Hertz resonant frequency of the actuator (including the "acoustic" mass in the nozzle).

Figure 13:
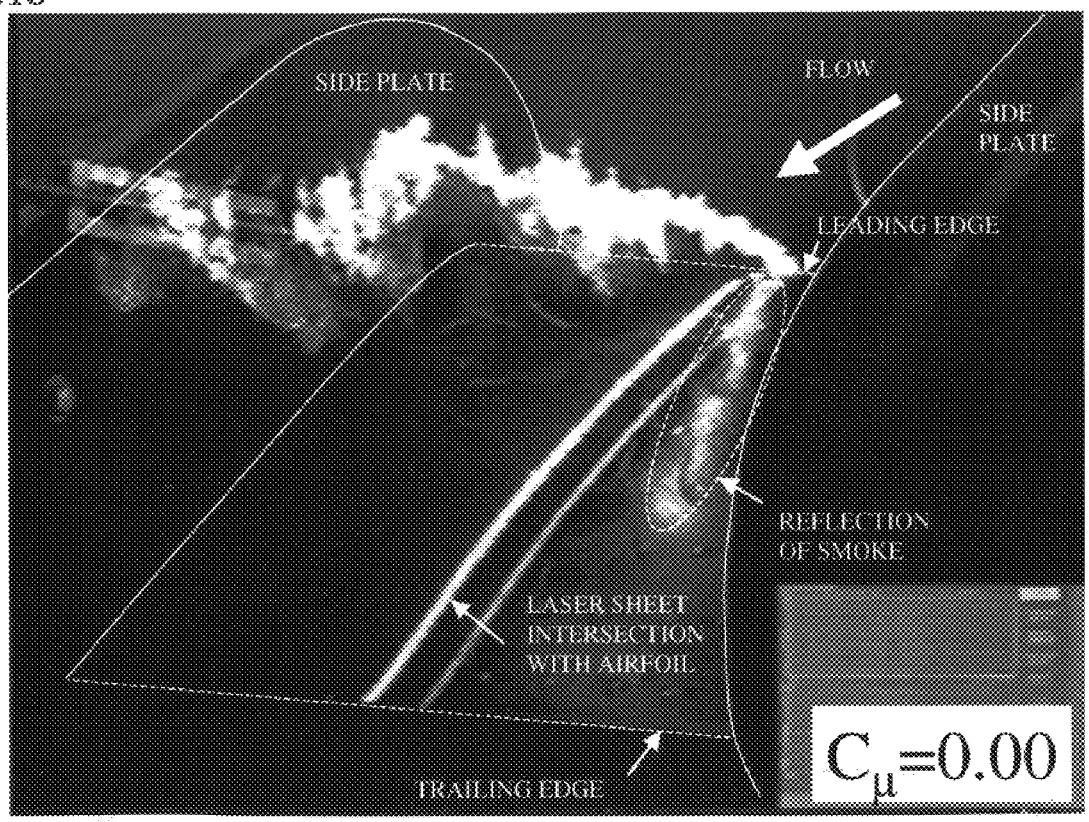
FIG. 13 is a laser stroboscopic illustration of boundary layer separation with a momentum coefficient of zero, showing the intersection of the laser strobe light with the airfoil of the test rig, without the enhancement that has been provided in FIGS. 14–18.
Figure 14:
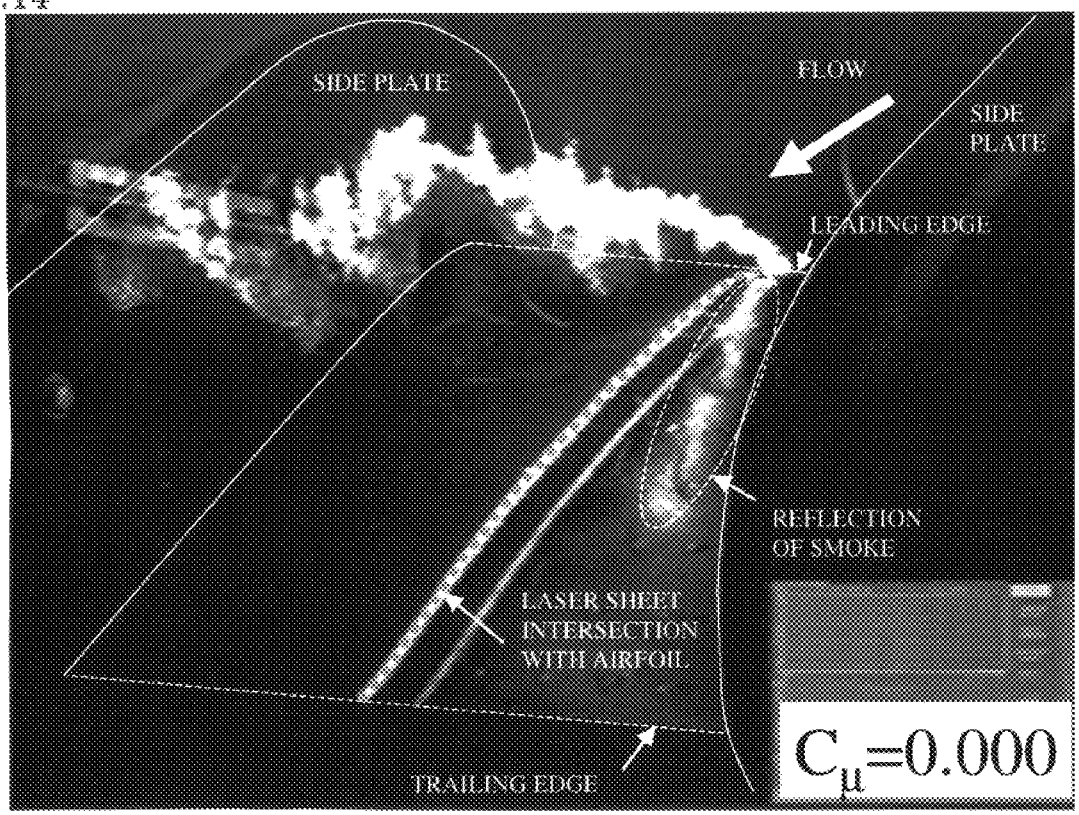
FIGS. 14–18 are photographs illustrating boundary layer separation control according to the present invention, for momentum coefficients of 0.00 through 0.025.

In FIG. 13, with no tangential acoustic jet action at all, the smoke which initially is adjacent to the surface of the airfoil at the leading edge 101 is seen to be significantly separated therefrom. The view of smoke in FIG. 13 is the intersection with a vertical sheet of laser light in substantially the streamwise center of and vertically parallel to the flow over the airfoil 100. The impingement of the laser sheet on the surface of the airfoil is shown by the large white line which is appropriately marked with the legend "Laser sheet intersection with airfoil" in FIG. 13. Thus, all of the smoke seen above and to the left of the laser sheet intersection with the airfoil is directly above the laser sheet intersection with the airfoil, all in the same plane. Some of that reflects off the airfoil itself, as is marked in FIGS. 13 and 14 with a dotted ellipse having the legend "Reflection of smoke". In FIGS. 14–18, the intersection of the laser sheet with the airfoil has been enhanced by marking it with alternate light and dark squares so that it does not get lost in the smoke as the momentum coefficient is increased. FIG. 14 is identical to FIG. 13 except for the enhancement of the intersection. A second white line, parallel to the intersection of the laser sheet with the airfoil, is simply a line of white coloration in an otherwise black airfoil, which has nothing to do with the experiments, and which simply results from the process used in providing a black coating on the airfoil so that the smoke effects could be clearly seen.

In FIGS. 14–18, progressive increases in momentum flux result in reduction of boundary layer separation, initially, and ultimately absolute adherence of the boundary layer to the airfoil surface. The current scientific literature relating to affecting boundary layers with unsteady forcing typically utilizes a parameter referred to as "momentum coefficient", $C_\mu$, to quantify the level of unsteady forcing. This coefficient represents the fractional amount of time-averaged momentum flux in a slot relative to the free stream momentum flux over the streamwise distance equal to the length of the phenomenon of boundary control, which may either be the chord length or the length of boundary layer separation along a surface of the airfoil, as is appropriate in any given situation. The momentum coefficient is:

$$C_\mu = \frac{u_N^2 w}{U_\infty^2 c}$$

where $u_N$ is the amplitude of the oscillation velocity of the air particles exiting the nozzle or slot of the acoustic jet, w is the streamwise width (along the flow) of the slots or nozzles of the tangential acoustic jet, $U_\infty$ is the freestream velocity of the flow, and c is the length of the phenomenon (airfoil chord or actual length of the uncontrolled separated flow). In FIGS. 14–18, the momentum coefficient was controlled by controlling the amplitude of velocity of the air molecules in the nozzle or slot of the tangential acoustic jet (monotonically increasing with speaker power). In turn, the velocity of the air particles exiting the jet was controlled by power applied to the two loudspeakers in the speaker enclosures 106.)

Figure 15:
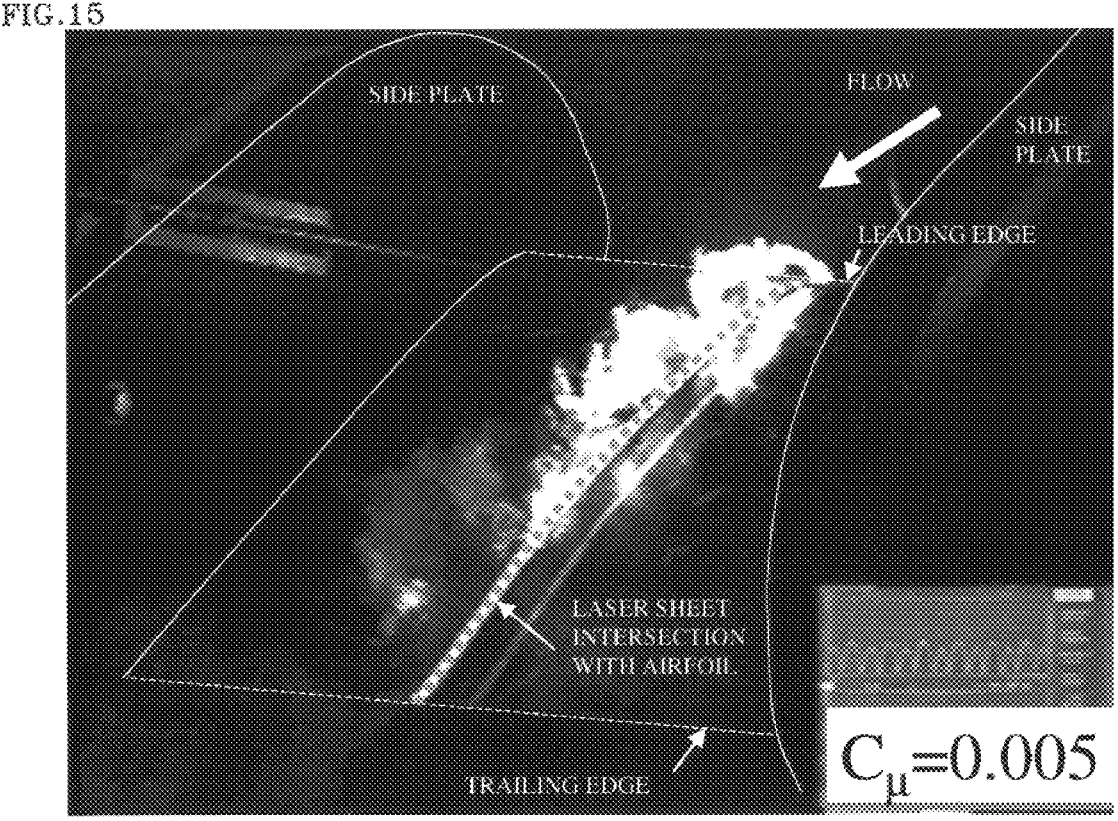
Figure 16:
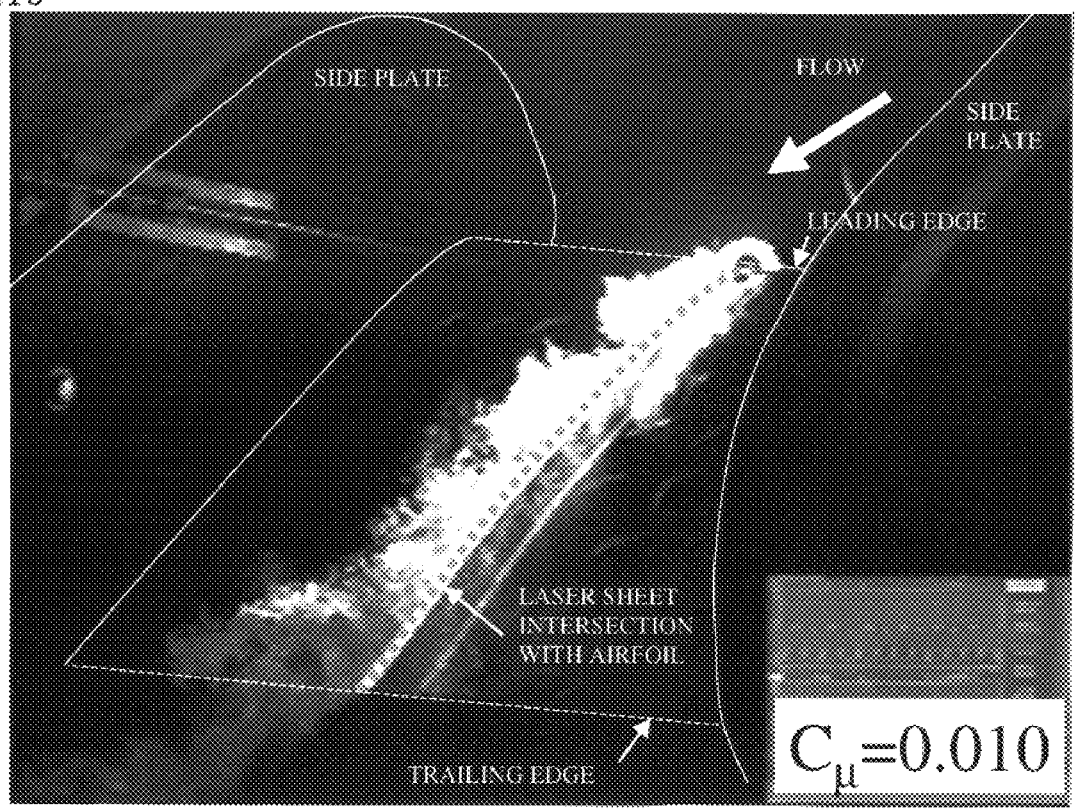
Figure 17:
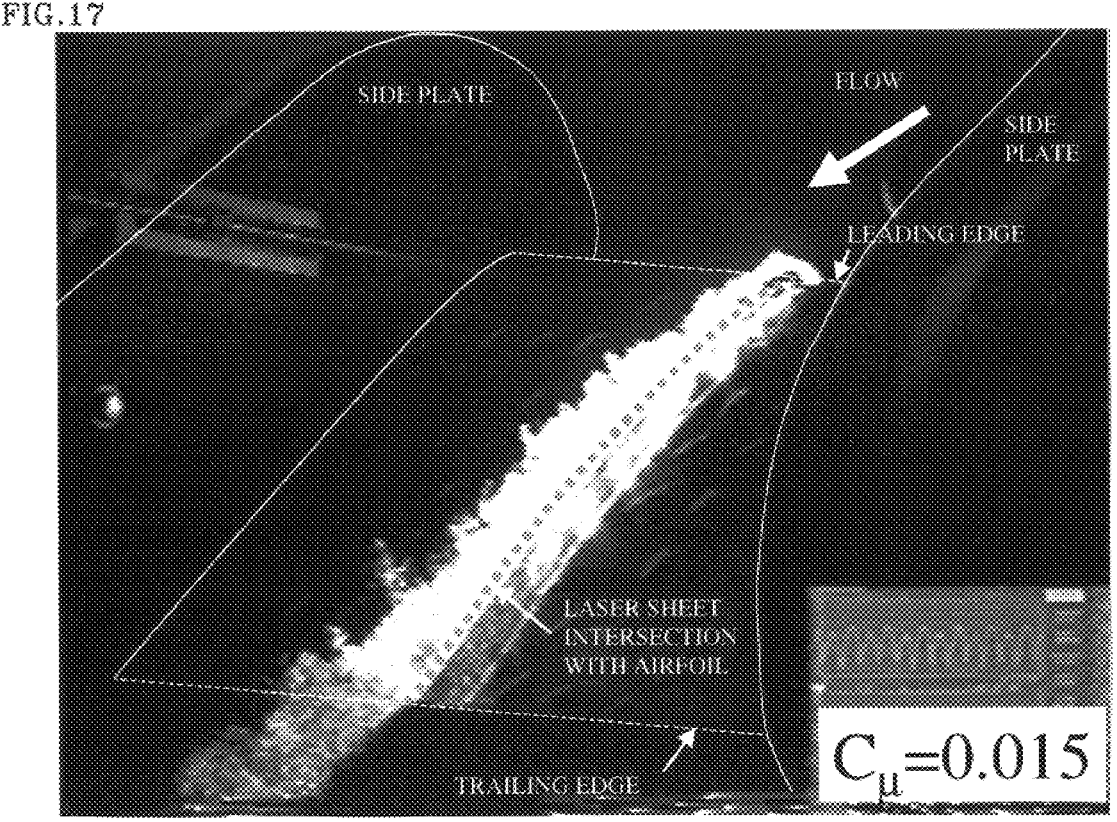
Figure 18:
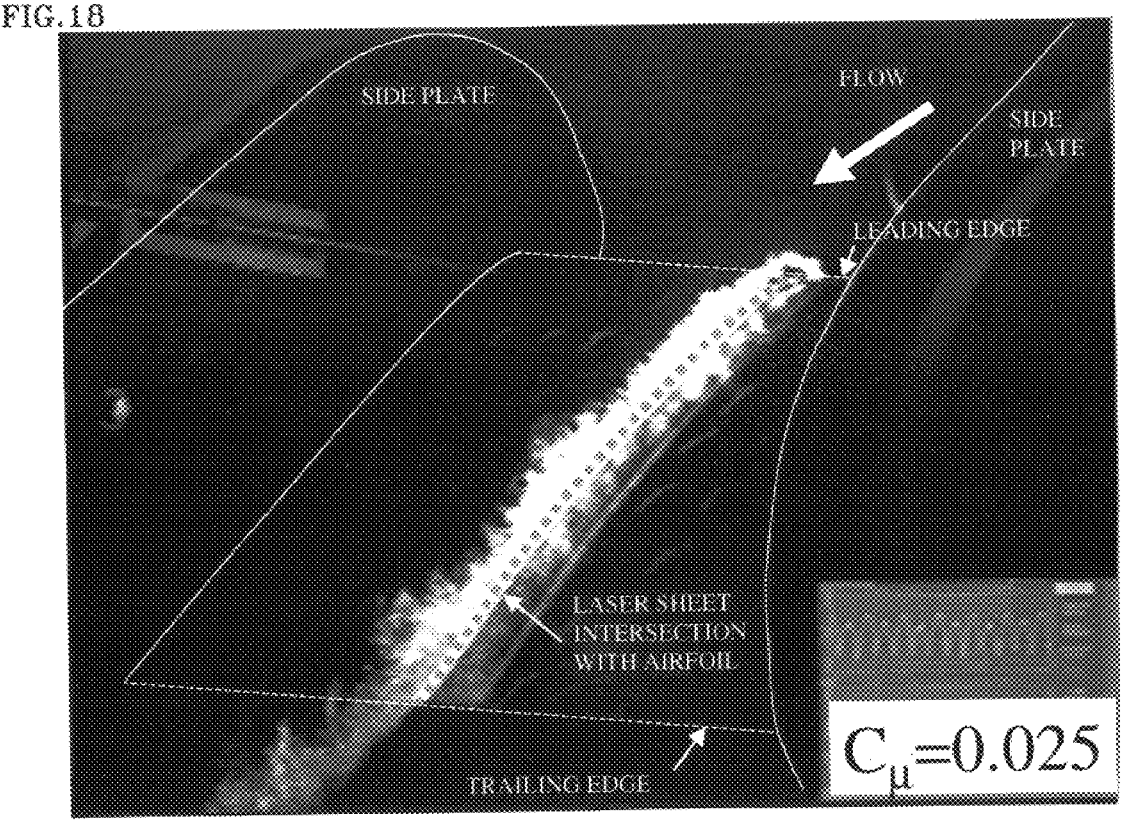

In FIGS. 13 and 14, the applied power is zero so there is no air exiting the slots, and the momentum coefficient is zero; the flow resembles FIG. 1A. In FIG. 15, the momentum coefficient equals 0.005, and it can be seen that the boundary layer has been pulled rather close to the surface of the airfoil, but it is still extremely turbulent (unsteady) and has large vortical structures synchronized with the acoustic forcing, as shown in FIG. 1B and as appear in FIG. as swirls of smoke. In FIG. 16, the momentum coefficient is 0.010 and the flow is even closer to the airfoil surface, with less turbulence, and no apparent vortical structures. In FIG. 17, with a momentum coefficient of 0.015, the flow adheres to the surface of the airfoil over nearly the full length of the airfoil. In FIG. 18, with the momentum coefficient of 0.025, the boundary layer is absolutely adhered to the entire surface, with minimal turbulence, and no apparent vortical structures of any consequence.

FIG. 18 illustrates the results which are achievable with the present invention. These results are in contrast with the prior art in which vortical structures are amplified to provide sufficient momentum flux to delay the onset of boundary layer separation to a degree, but still having boundary layer separation, including vortices. With the invention, as seen in FIG. 18, the boundary layer can be made to absolutely adhere to the surface.

In the embodiments hereinbefore, it is assumed that the gas pressure oscillation generators (such as 30, FIG. 3) are loudspeakers. In FIG. 19, a gas pressure oscillation generator 130 comprises a piston 131 driven by a rod 132 which is alternately pulled to the left by an electromagnet 133 or pushed to the right by a spring 134. The piston 131 slides within a cylinder 136 which is open to a chamber 138 formed within a structure 139 having a surface with an aerodynamic profile 140, and a tangentially oriented nozzle 142 of the invention. Other electroacoustic devices may similarly be utilized so as to create the pressure oscillations for the tangential acoustic jet of the invention.

Referring to FIG. 20, a mechanoacoustic gas pressure oscillation generator utilizes a paddle-like vane 150 oscillating within a chamber 151, between a position shown in solid lines and a position shown in dotted lines, to alternately provide an outstroke in a jet nozzle 154 and an instroke in a jet nozzle 155, as shown, and then provide the instroke to the nozzle 154 and the outstroke to the nozzle 155, when moving toward the position shown in dotted lines. The vane 150 is driven by a crank disk 158 which has a pin 159 engaging a slot 161 on a bell crank 162. The bell crank 162 is journaled by a pivot 164 in a fixed pillow block 166. The bell crank 162 will oscillate about the pivot 164 as shown by the arrow 167 in response to north pole and south pole magnets 168, 169 rotating on a shaft 170 which may be driven by the shaft of a fan or other apparatus with which the tangential acoustic jet of the invention is to be utilized. As the magnets 168, 169 rotate, they alternatively attract and repel north-pole and south-pole magnets 172, 173 disposed on the bell crank 162. In FIG. 20, the crank disk 158 is fixed to a shaft 175 with which it oscillates. The shaft 175 is resiliently journaled to the underlying structure 176, either by means of a torsional coil spring, or, preferably, by means of a Lucas Free-Flexo flexural pivot 178 which not only provides frictionless journaling, but also spring resistance to rotation either side of a median position. This provides resonant motion for greatest efficiency.

The mechanoacoustic gas pressure oscillation generator of FIG. 20 may alternatively have its bell crank 162 driven by a cam 180 and rotating cam follower 181, as shown in FIG. 21. Or, the gas pressure oscillation generator of FIG. 20 may be electroacoustic, utilizing a solenoid having a fixed permeable core 184 with a solenoid coil 185 surrounding it to successively attract a highly permeable mass 187 disposed on the bell crank 162, in an oscillatory fashion. The apparatus of FIGS. 20–22 provides pulses of air tangentially through slot-shaped nozzles 154, 155 into a boundary layer flow, according to the invention. The apparatus described thus forms a pair of tangential acoustic jets of the invention within the structure 176 having a surface with a boundary layer. Other mechanoacoustic and electroacoustic devices may be utilized to provide pressure oscillations of the invention. The gas pressure oscillation generator may be driven by other mechanical, electromechanical, electromagnetic, piezoelectric, or other mechanisms.

Although described thus far with respect to airfoils and fuselages, the invention, a tangentially directed, acoustic jet for control of boundary layers, may be practiced in other structures with a surface having an aerodynamic profile, or with non-aerodynamic structures, including certain bluff bodies or in other applications and with other gases where there is a potential boundary layer separation problem. For instance, the airfoil illustrated herein as a helicopter blade and as a wing may be a blade of air moving machinery, rotors and/or stators of a gas turbine engine, or it may be a support strut within a gas flow, a helicopter rotor pylon, and so forth.

Figure 23:
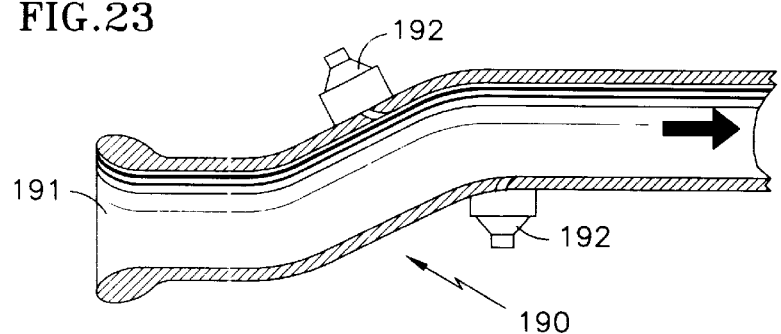
FIG. 23 is a partial, partially sectioned, top plan schematic illustration of a turning duct, such as the engine air inlet duct on a military aircraft, employing the present invention.

Referring now to FIG. 23, a turning duct 190 conducts engine air from an inlet 191 to an engine, not shown on an aircraft, such as a helicopter or a military aircraft. As the flow turns, it accelerates, and as it turns back the pressure rises and separation can occur if the turns are too short in contrast with the required flow. Use of tangential acoustic jets 192 of the invention as shown allows shorter turning sections without separation of the boundary layer. The configuration of FIG. 23 may also represent a turning duct 190 in the exhaust system of an aircraft engine.

Figure 24:
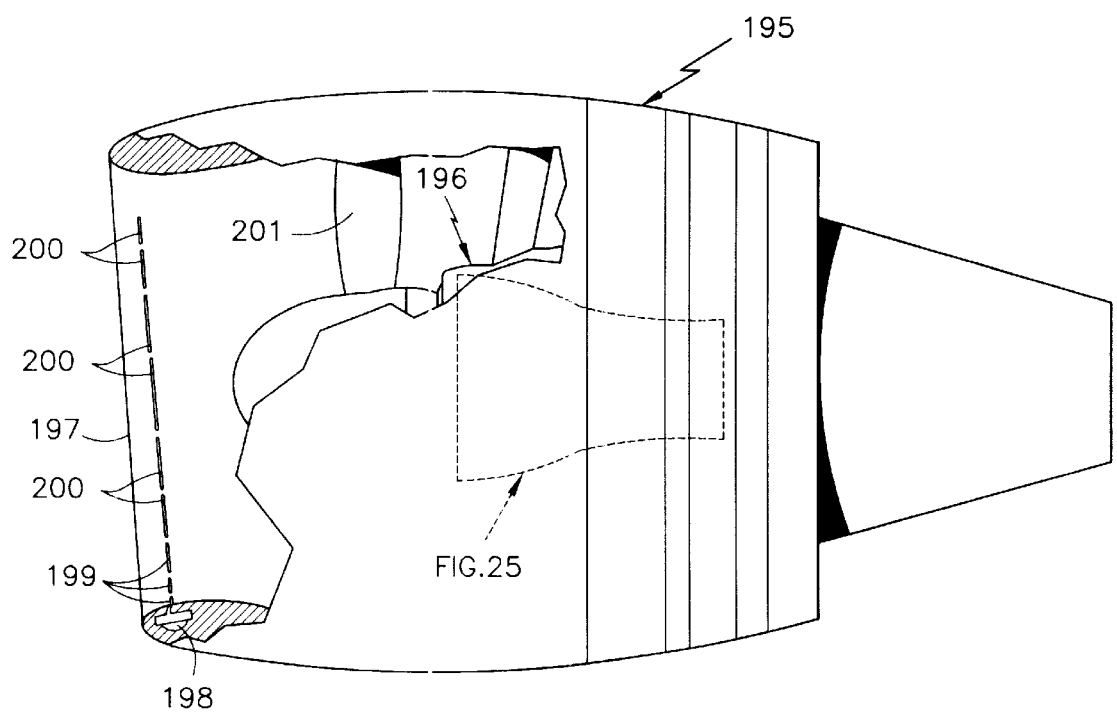
FIG. 24 is a partially broken away, partially sectioned side elevation view of a commercial jet engine utilizing the present invention in the lower lip and side lips of the air inlet.

In FIG. 24, the nacelle 195 of a typical commercial airliner jet engine 196 includes an inlet 197 in which a plurality of tangential acoustic jets 198 of the invention drive a plurality of slot-shaped bottom nozzles 199 and, separately, similar acoustic jets (not shown) drive a plurality of slot-shaped side nozzles 200, on each side of the inlet 197. As is known, the inlet normally is provided with very thick lips on the sides of the inlet to accommodate cross-winds as the airplane starts rolling with maximum thrust, and the inlet is provided with a thick lip on the bottom to handle high flow incidence angles during maximum rotation of blades 201 at takeoff and just after takeoff. However, the thick lips provide unwanted drag at cruise speeds. Thus, the tangential acoustic jets 198 driving the nozzles 200 can be energized as the airplane begins to move until it takes off, and then they can be deenergized. Similarly, at takeoff and following takeoff, the tangential acoustic jets 198 driving the nozzles 199 may be energized, and then as thrust is reduced during climb, these jets can be turned off. This will allow the lips of the inlet to be thinner, thereby reducing drag at cruise speeds. The tangential acoustic jets of the invention can be used around the entire periphery of the engine air inlets, in order to shorten the length of the diffuser (from the tip of the inlet to the first compressor rotor). In such a case, the jets will need to be operated continuously in flight.

Figure 25:
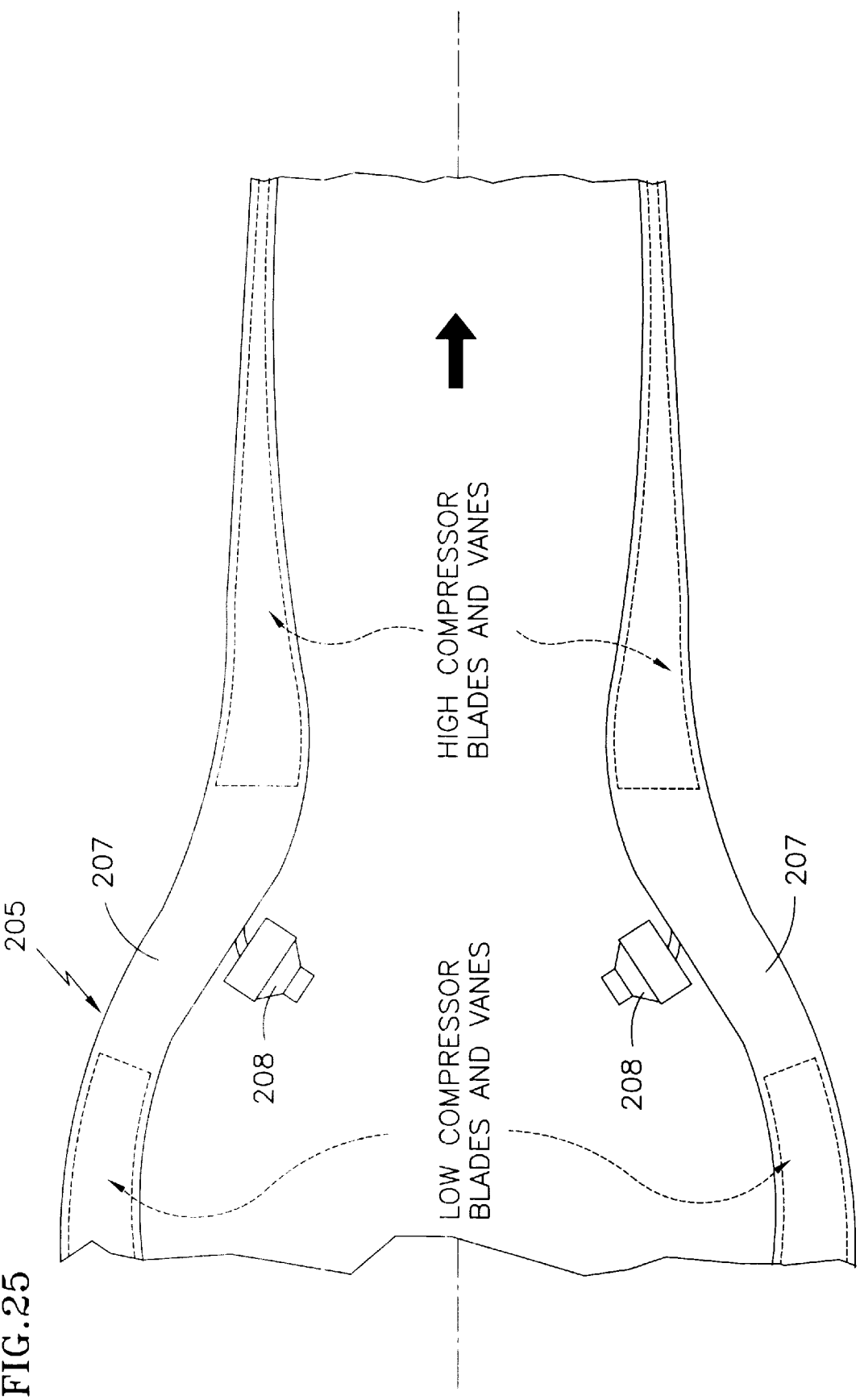
FIG. 25 is a schematic outline of the intermediate case of an axial flow gas turbine engine employing the present invention.

Referring to FIG. 25, the intermediate case 205 of an axial flow gas turbine engine, such as the commercial jet engine 196 of FIG. 24, forms a three-dimensional turning duct 207, the length of which (right to left in FIG. 25) can be reduced by utilizing tangential acoustic jets 208 about the inner periphery thereof, as shown. If desired, tangential acoustic jets can be appropriately placed on the outer periphery of such a duct, as well.

Although described with respect to certain embodiments, a tangential acoustic jet for control of boundary layers in gas flow may be practiced in other gas flow applications where there are boundary layer separation problems.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A gas flow system, comprising:
a gas flow path adjacent a surface, gas flowing within said path having a boundary layer adjacent said surface;
a chamber;
a gas pressure oscillation generator for providing gas in said chamber having significant oscillatory pressure components at substantially a selected frequency; and
a gas passage interconnecting said chamber with said gas flow path, said passage directed into said flow at a small acute angle with respect to said surface so that said chamber, said gas pressure oscillation generator, and said passage form a tangential acoustic jet of which said passage forms the nozzle, to provide a stream of high momentum flux gas particles substantially tangentially into said boundary layer which causes, in a region downstream of said nozzle, substantially steady streamline flow with said boundary layer absolutely attached to said surface; and wherein
said frequency is selected to provide predetermined mass flow into and out of said chamber, as a function of the physical parameters of said chamber, said nozzle and said gas pressure oscillation generator.

2. A system according to claim 1, wherein:
said chamber and said nozzle have significant resonance at a band of frequencies inclusive of said predetermined frequency.

3. A system according to claim 1 wherein:
said predetermined frequency is between twenty Hertz and three hundred Hertz.

4. A system according to claim 3 wherein:
said predetermined frequency is on the order of fifty Hertz.

5. A system according to claim 1 wherein:
said stream is the time average of pulses of gas particles.

6. A system according to claim 1 wherein:
said gas pressure oscillation generator comprises an electroacoustic transducer.

7. A system according to claim 6 wherein:
said electroacoustic transducer comprises a diaphragm.

8. A system according to claim 6 wherein:
said electroacoustic transducer comprises a loudspeaker.

9. A system according to claim 8 wherein:
said electroacoustic transducer comprises a loudspeaker having high Q.

10. A system according to claim 6 wherein:
said electroacoustic transducer comprises a reciprocating wall.

11. A system according to claim 10 wherein:
said electroacoustic transducer comprises a resonant solenoid-driven piston.

12. A system according to claim 1 wherein:
said gas pressure oscillation generator comprises a mechanoacoustic transducer.

13. A system according to claim 12 wherein:
said gas pressure oscillation generator comprises an element driven by a crank.

14. A system according to claim 12 wherein:
said gas pressure oscillation generator comprises a rotationally oscillating element.

15. A system according to claim 1 wherein:
said gas pressure oscillation generator comprises a linearly oscillating element.

16. A system according to claim 1 wherein:
said surface is a diverging surface of a diffuser.

17. A system according to claim 16 wherein:
said nozzle directs said stream into said flow in the vicinity of the boundary layer separation point of said flow in said diffuser.

18. A system according to claim 16 wherein:
said nozzle directs said stream into said flow upstream of the boundary layer separation point of said flow in said diffuser.

19. A system according to claim 16 wherein:
said boundary layer is fully attached to substantially all of said diffuser downstream of said nozzle.

20. A system according to claim 1 wherein:
said surface is the suction side of an airfoil.

21. A system according to claim 20 wherein:
said boundary layer is fully attached to substantially all of said airfoil downstream of said nozzle.

22. A system according to claim 20 wherein said airfoil is selected from the group consisting of helicopter rotor blades and wings.

23. A system according to claim 20 wherein said nozzle directs said stream into said boundary layer in the vicinity of the boundary layer separation point of said flow on said airfoil.

24. A system according to claim 20 wherein said nozzle directs said stream into said boundary layer upstream of the boundary layer separation point of said flow on said airfoil.

25. A system according to claim 1, wherein:
said path includes a diffuser.

26. A system according to claim 25 wherein:
said nozzle interconnects said chamber and said diffuser at a point in the vicinity of the boundary layer separation point of said flow in said diffuser.

27. A system according to claim 25 wherein:
said nozzle interconnects said chamber and said diffuser at a point upstream of the boundary layer separation point of said flow in said diffuser.

28. A system according to claim 25 wherein:
said diffuser is part of an air moving machine including a fan.

29. A system according to claim 28 wherein:
said fan is an axial fan.

30. A system according to claim 28 wherein:
said fan is a vane-axial fan.

31. A system according to claim 28 wherein:
said fan is a centrifugal fan.

32. A system according to claim 1 wherein:
said surface is the suction surface of an airfoil having a main portion and a flap portion hinged to said main portion at a joint, and said nozzle directs gas particles into said flow at a point just upstream of said joint.

33. A system according to claim 1, further comprising:
a second chamber disposed adjacent said first named chamber, said gas pressure oscillation generator disposed in gas tight relation between said chambers and providing in said second chamber gas having oscillatory pressure components at substantially said selected frequency; and a second gas passage interconnecting said second chamber with said gas flow path, said second passage directed into said flow at a small acute angle with respect to said surface so that said second chamber, said gas pressure oscillation generator and said second passage form a second tangential acoustic jet of which said second passage is the nozzle, to provide an additional stream of high momentum flux gas particles substantially tangentially into said boundary layer which causes, in a region downstream of said second nozzle, substantially steady streamline flow with said boundary layer absolutely attached to said surface.

34. A system according to claim 33 wherein said second passage is disposed cross-stream of said first named passage in said flow path.

35. A system according to claim 33 wherein said second passage is disposed streamwise of said first named passage in said flow path.

36. A system according to claim 35 wherein said second passage is disposed downstream of said first named passage in said flow path.

37. A system according to claim 1 wherein:
said surface comprises an air inlet to a jet engine.

38. A system according to claim 37 wherein:
said surface is the lip of an engine air inlet of a commercial jet engine.

39. A system according to claim 38 wherein said surface is the bottom lip of a commercial jet engine air inlet.

40. A system according to claim 38 wherein said surface is a side lip of a commercial jet engine air inlet.

41. A system according to claim 37 wherein said surface is within a turning duct of a jet engine air inlet.

42. A system according to claim 1 wherein said surface is within a turning duct of a jet engine exhaust.

43. A system according to claim 1 wherein said surface is within a turning duct in the gas flow path of an axial flow gas turbine.

44. A system according to claim 43 wherein said surface is within the intermediate case of an axial flow gas turbine.

45. A system according to claim 1 wherein said small acute angle is between near zero degrees and forty degrees.

46. A system according to claim 1 wherein said gas flow has a Reynolds number in excess of a critical value above which the flow is turbulent.

* * * * *